(12) United States Patent
Tucker et al.

(10) Patent No.: US 9,933,226 B2
(45) Date of Patent: *Apr. 3, 2018

(54) MULTIPURPOSE SECURING DEVICE AND METHODOLOGY

(71) Applicant: Evergreen Asset Management, LLC, St. Paul, MN (US)

(72) Inventors: David Sumner Tucker, Bloomington, MN (US); Jerry Dean Boggess, Wesley Chapel, FL (US)

(73) Assignee: Evergreen Asset Management, LLC, St. Paul, MN (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/853,483

(22) Filed: Sep. 14, 2015

(65) Prior Publication Data
US 2016/0010939 A1    Jan. 14, 2016

Related U.S. Application Data

(63) Continuation of application No. 13/842,524, filed on Mar. 15, 2013, now Pat. No. 9,134,085.
(Continued)

(51) Int. Cl.
| F41A 23/00 | (2006.01) |
| F41A 23/18 | (2006.01) |
| F41C 33/00 | (2006.01) |
| F16B 1/00 | (2006.01) |
| F16B 2/22 | (2006.01) |
| F16M 13/02 | (2006.01) |

(Continued)

(52) U.S. Cl.
CPC ............... *F41A 23/18* (2013.01); *F16B 1/00* (2013.01); *F16B 2/22* (2013.01); *F16M 13/02* (2013.01); *F16M 13/022* (2013.01); *F41A 23/02* (2013.01); *F41A 23/16* (2013.01); *F41C 33/003* (2013.01); *F16B 2001/0035* (2013.01)

(58) Field of Classification Search
USPC .......... 42/94; 248/205.2, 205.3, 206.5, 309.1
See application file for complete search history.

(56) References Cited

U.S. PATENT DOCUMENTS

| 3,746,177 A | 7/1973 | Vilotti |
| 4,333,385 A | 6/1982 | Culver |

(Continued)

OTHER PUBLICATIONS

StickimUp Gun Magnets (http://www.stickimupgunmagnets.com). Retrieved Dec. 5, 2013.
(Continued)

*Primary Examiner* — John W Eldred
(74) *Attorney, Agent, or Firm* — Crawford Maunu PLLC

(57) ABSTRACT

Consistent with various embodiments, a firearm securing apparatus has a first securing interface that is configured to generate a holding force between the apparatus and a support surface in response to an applied pressure. A second securing interface is configured and arranged to receive and secure a firearm barrel and includes a graspable feature. A support piece is configured and arranged to physically connect the two securing interfaces and to provide space, to allow a person's fingers to seize a graspable feature and to allow the person to apply pressure sufficient to overcome the holding force between the apparatus and the surface in order to remove the firearm from the apparatus when desired.

20 Claims, 15 Drawing Sheets

Related U.S. Application Data

(60) Provisional application No. 61/735,236, filed on Dec. 10, 2012.

(51) Int. Cl.
  *F41A 23/02* (2006.01)
  *F41A 23/16* (2006.01)

(56) References Cited

U.S. PATENT DOCUMENTS

| | | | |
|---|---|---|---|
| 5,078,279 A | 1/1992 | Hancock et al. | |
| 6,042,080 A | 3/2000 | Shepherd et al. | |
| 6,155,523 A | 12/2000 | Pitre | |
| 6,793,184 B2 | 9/2004 | Dougal et al. | |
| 8,266,835 B2 * | 9/2012 | Pintar | F41A 17/02 42/70.06 |
| 8,403,278 B1 * | 3/2013 | Kasbohm | F41C 33/06 211/64 |
| 2005/0115137 A1 | 6/2005 | Minneman | |
| 2005/0145585 A1 | 7/2005 | Pintar | |
| 2008/0127815 A1 | 6/2008 | Yale et al. | |
| 2010/0012691 A1 | 1/2010 | Hyle | |
| 2010/0102184 A1 * | 4/2010 | Gorsuch | F41B 5/14 248/218.4 |
| 2010/0236125 A1 | 9/2010 | Morrow et al. | |
| 2011/0167705 A1 | 7/2011 | Cauley et al. | |
| 2012/0246900 A1 | 10/2012 | Shimmel et al. | |
| 2013/0269509 A1 * | 10/2013 | Irwin | F41A 23/005 89/37.01 |

OTHER PUBLICATIONS

Magnetic Barrel Rest (http://www.battenfeldtechnologies.com). Retrieved Dec. 5, 2013.
Fastrak—Magnetic Gun and Fishing Pole Holder (http://www.outdoorconnection.com). Retrieved Dec. 5, 2013.
Barrel and Rod Safe (http://www.hunterspec.com). 2009-2013, Magnetic Gun Caddy(TM) (http://www/magnetguncaddy.com).

* cited by examiner

US 9,933,226 B2

MULTIPURPOSE SECURING DEVICE AND METHODOLOGY

OVERVIEW

The present disclosure relates generally to securing firearms, and to systems, methods and devices for securing small arms using a device that may have various mechanisms for attachment, protection and related uses.

Small arms can be categorized into long guns and hand guns. Long guns have extended lengths and are designed to be fired while braced against the shoulder. This feature, along with the longer barrel and easier stabilization, can increase accuracy for a shooter. The additional length, however, can make long guns difficult to carry and store. For instance, long guns can be particularly problematic when working in tight quarters, such as military personnel performing daily activities on a naval vessel, in a vehicle, aboard aircraft or even in the field. Improper storage can result in the weapon falling to the ground, striking other objects or even banging into other weapons. Such mishaps can cause bent barrels, broken sights and unstable optics, which can render the weapon unusable, inaccurate, and even unsafe. Moreover, a fallen weapon can be more difficult to retrieve, which may slow down a soldier when time may be of critical importance.

Permanently affixed storage weapon lockers and weapon racks offer adequate solutions for storing long guns. While such solutions can be useful, they require time and effort to install, and possibly prior knowledge of appropriate and effective storage locations. Such circumstances are often less than ideal. For instance, soldiers may sometimes need to set down their weapons in unanticipated locations. Moreover, permanent storage solutions in multiple locations can be costly, take up valuable space and add unnecessary weight when located on vessels.

Soldiers also have a need to sight-in their weapons periodically. Resting the weapon barrel on a stable object can facilitate this action; however, a hard surface can damage the barrel. Accordingly, it can be difficult to find a suitable location and setup for sighting in the weapon.

Yet other aspects of the present disclosure relate to multipurpose solutions for securing long arms and solutions having particular usefulness in military environments. Certain aspects relate to various uses stemming from the firearm being secured by the device during activities, such as sighting, maintenance, cleaning or other acts.

SUMMARY

Aspects of the present disclosure are directed to multipurpose weapon (firearm)-securing devices, and methods of using the devices in order to address challenges, including those discussed herein. The securing devices apply to a variety of applications. These and other aspects of the present disclosure are exemplified in a number of implementations and applications, some of which are shown in the figures and characterized in the claims section that follows.

Particular embodiments of the present disclosure are directed toward a multipurpose device for securing small arms. The device can be specially configured with a number of features, some of which can be particularly useful for military applications.

Consistent with various embodiments, a firearm securing apparatus comprises a first securing interface that is configured and arranged to generate a holding force between the apparatus and a surface in response to a pressure that is applied between the apparatus and surface. A second securing interface is configured and arranged to receive and secure a firearm barrel, and this interface also includes a graspable feature. A support piece is configured and arranged to physically connect the two securing interfaces and to provide space between the two securing interfaces that is sufficient to accommodate a person's fingers for seizing the graspable feature. The support piece's design also allows the user to apply sufficient leverage to overcome the holding force between the firearm securing apparatus and the surface of the support structure.

Other embodiments relate to manufacturing and uses of such multipurpose devices.

The above summary is not intended to describe each illustrated embodiment or every implementation of the present disclosure.

BRIEF DESCRIPTION OF THE DRAWINGS

The disclosure may be more completely understood by considering the following detailed description of various embodiments of the disclosure in connection with the accompanying drawings, which are consistent with the various embodiments of the disclosure as follows.

Figure 1:
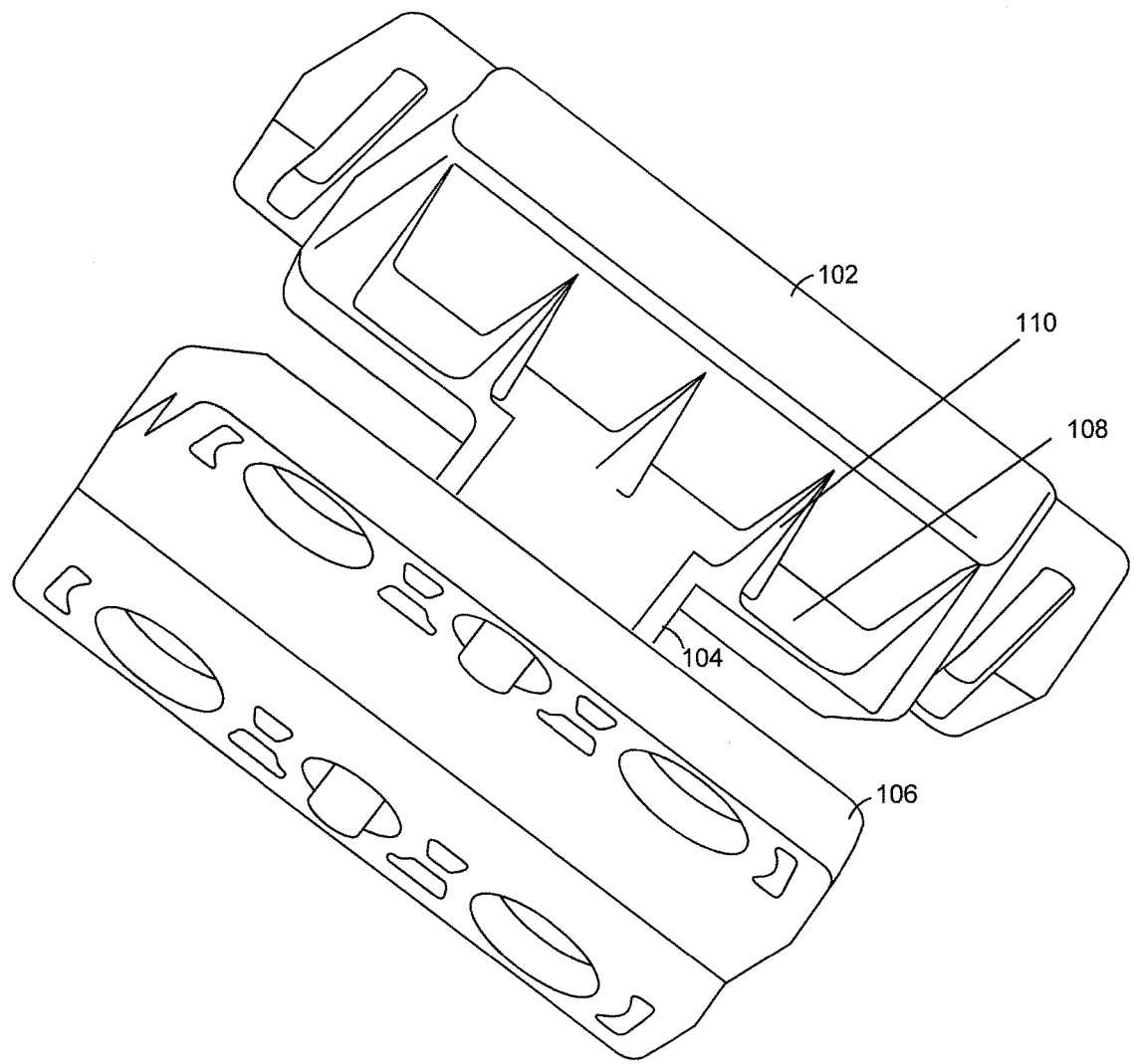
FIG. 1 depicts an experimental embodiment of a Multi-Purpose Weapon Holder ("MPWH") that includes an injection molded unit with two platforms (upper & lower) and a connecting unit between the platforms, consistent with embodiments of the present disclosure.

While the disclosure is amenable to various modifications and alternative forms, specifics of the disclosure are shown by way of example in the drawings and will be described in detail. It should be understood, however, that the disclosure is not necessarily limited to the particular embodiments described. On the contrary, the intention is to cover all modifications, equivalents, and alternatives falling within the spirit and scope of the disclosure.

DETAILED DESCRIPTION

Aspects of the present disclosure include multipurpose devices for securing small firearms and to related approaches, uses and systems. While the present disclosure is not necessarily limited to such applications, several aspects of the disclosure may be appreciated through a discussion of various examples.

Certain aspects of the present disclosure are directed toward a device that allows small arms to be secured to a variety of different surfaces. Particular embodiments include one or more securing mechanisms that allow the device to be relocated and reused in a variety of different locations having different attachment surfaces. Certain aspects are particularly applicable to military applications and uses.

Embodiments are directed toward a device that facilitates aiming of small arms while also securing and providing protection for the barrel. The device can be configured to allow for the firearm to be canted in different directions so that it can be aimed, while also providing support and stability. A carefully-designed support structure cushions the barrel to help reduce potential damage that can result from the recoil of the firearm.

Consistent with embodiments discussed in more detail herein, a device includes two major faces or platforms. The use of two separate platforms (connected by a thinner support piece) can be useful in a number of different settings. Embodiments of the present disclosure are directed toward uses, improvements and/or supplements for a two-platform structure.

According to certain embodiments, a first platform can be configured to interface with a structure such as a wall. This first platform can include one or more attachment mechanisms for allowing the device to be attached, removed and reattached to different structures and in different positions and locations. Thus, certain embodiments include multiple attachment mechanisms, each of which may be suitable in different situations and for different structures. For example, military personnel may carry a portable Multi-Purpose Weapon Holder (MPWH) device in order to secure a firearm in a wide variety of locations, and/or in order to stabilize the firearm during use, all with a quick setup time and while allowing a firearm to be seized at a moment's notice.

The attachment mechanisms can include well-known solutions, such as magnets. Consistent with these approaches, magnets can be placed in recessed cavities, as shown in several references such as U.S. Pat. No. 6,155,523 (discussing a magnet within a recessed casing) and U.S. Pat. No. 6,793,184 (discussing a magnetic attachment using countersunk magnets and recessed portions), each of which is fully incorporated herein by reference. The use of recessed cavities can facilitate flush placement of the device against a metal surface and/or maintain an air gap between the magnet and the magnetic surface to which the device is attached. While this well-known attachment mechanism has its uses, it has been discovered that other attachment options may be desirable, particularly in certain military applications, e.g., due to the fact that certain military vessels and vehicles use non-ferromagnetic materials. Accordingly, embodiments are directed toward various types of specialized attachment solutions, which can be used alone or in combination.

The second platform can be configured to include a deformable weapon/firearm securing portion. This securing portion can be configured and arranged to allow the barrels of different firearms to be secured to the device. For instance, the deformable portion can include a (curved) cavity that is sized and configured to secure the barrel of the firearm. The deformable aspect can form an opening to the cavity that is smaller than the barrel of the firearm, but that elastically deforms with pressure so as to allow the barrel of the firearm to traverse the opening. After insertion of the barrel, the deformable portion then returns to its original form, thereby securing the firearm. Particular embodiments of the present disclosure are directed toward a device that includes a deformable portion that provides resistance sufficient to prevent unintentional dislodging of the firearm from the deformable portion by minimal force (e.g., by movement of a vehicle/vessel/aircraft). Moreover, the MPWH can be designed such that the force required to dislodge or remove the firearm from the MPWH device is less than the force required to remove the MPWH device from a support structure. This arrangement allows a person to use the firearm without first removing the MPWH device from a support structure. A person wishing to remove or move the MPWH device can do so after removing the firearm and by applying additional force. Thus, the securing mechanism can be configured to provide sufficient holding force to allow the firearm to be removed, but not so much as to prevent or make it difficult for a person to remove the MPWH device from the support structure using the strength in their hands.

Consistent with certain embodiments, a strap can be used to provide additional holding strength. This can be particularly useful when there are significant external forces (e.g., from movement of motor vehicles, aircraft, naval vessels, etc.). Moreover, the MPWH device can also be designed to remain on the firearm as it is removed from a support structure. For instance, a solider may need to quickly access the firearm that is secured to a wall using magnets (or a reclosable fastener system) on the MPWH. If the strap is employed, the solder can simply grab the firearm to disengage the magnets from the wall, while leaving the MPWH strapped to the barrel. This may also be advantageous when the soldier needs to take his firearm to a new location, but simply does not want to take the extra time to remove the MPWH from the barrel. The light-weight construction and relatively small size of the MPWH can reduce any adverse effects caused by leaving the MPWH on the barrel. Moreover, as discussed in more detail herein, the MPWH's multiple platform design can be particularly useful for providing a platform to stabilize the firearm during aiming. Thus, there are many situations where it can be desirable to leave the MPWH on the barrel.

The MPWH can be designed for attachment to a wide variety of different structures. A few non-limiting example structures include walls, floors, ceilings, doors, windows, vehicle panels, trees, rocks, boats, airplanes, wheels, sheds, cabinets, boxes, chairs, tables, desks, armored vehicles, fences, utility poles and more. For ease of discussion, the identification of a particular type of structure (e.g., a wall) will be understood to not be limiting unless otherwise stated.

Particular embodiments of the present disclosure are directed toward the contacting portion of the bottom platform being substantially planar, i.e., the portion that attaches to the support structure. A planar configuration conforms to numerous surfaces, even surfaces that are themselves not perfectly planar. The bottom platform, of other embodiments, has a non-planar interface, an example of which would include a curved interface. This can be particularly useful for attachment of the device to poles and similar objects. Another embodiment can be shaped as an L-bracket, which can be particularly useful when the device is placed at the corners of exterior walls or at the top of a wall, among other places. Other variations of the platform configuration are also possible.

The bottom platform can also be configured to include graspable portion(s) or handle(s) that can be used when securing the MPWH device to a structure and also when removing the MPWH device from the structure. The distance between the two platforms (which is partially defined by the length of the support piece connecting the platforms) can be sufficient to allow a person to grasp the platform and/or graspable portion while the device is flush with a flat surface. This distance can be configured such that a person will have enough leverage to remove the device using only his/her hands. Moreover, space between the platforms can be provided in order to facilitate attachment of the device to a wall or similar structure. This type of configuration can be particularly useful for an adhesive-like securing mechanism that requires a rocking motion and pressure to fully engage.

Consistent with certain embodiments, the MPWH configuration can facilitate canting of the firearm in multiple directions to allow it to be aimed and discharged (e.g., to adjust sights on the firearm or even during combat situations). For instance, the MPWH can facilitate canting of the gun by providing a raised platform that can easily tip backwards and forwards (using a rocking motion), and that can easily be rotated left to right. (With the latter design, the bottom platform is left unattached.) This tipping action can be facilitated by providing sufficient distance between the two platforms, which results from a support piece having suitable length. Further canting can be facilitated through the use of two separate deformable pieces that are designed to allow for some movement of the barrel within the MPWH. In addition, canting can be further facilitated by providing moveable joint(s) between the two platforms. With this design, each platform can move independently from the other platform, at least to the extent allowed by the joint(s).

In certain embodiments of the present disclosure, the device includes a leverage point in the form of an opening or protrusion that allows a tool to be inserted between the device and a wall or other structure. In particular, the leverage point allows the user to dislodge the device from a wall by inserting a lever that provides mechanical force between the wall and the device. For instance, the leverage point can be designed to accommodate readily available equipment, such as a multi-tool or a knife blade. The leverage point can be provided with additional support and/or reinforcement to withstand the force used to remove the device from an attached structure. Such support may include additional thickness in the platform near the leverage point and/or plating the leverage point with a sturdy material, such as metal.

Consistent with various embodiments, the top of the lower platform and the bottom of the upper platform can be ergonomically designed to allow the user to quickly and comfortably engage or disengage the MPWH unit using one or more of the attachment mechanisms, which may include adhesives, interlocking materials (e.g., hook and loop, Power-Grip Pedalboard, PaiGrip and/or Dual Lock), magnets or key slots. The open space between platforms permits a firm grip on both platforms and support stem, even when wet. The space between the platforms may also allow for storage of an optional hook and loop (Velcro) strap when not in use.

In certain embodiments, a specially-designed tool can be designed into the molded device. For instance, the device can include an integrated extension member that provides additional leverage for removal of the device from a wall or similar structure.

In other embodiments, the tool can be provided as a separate item. For instance, the tool can take the form of a curved bar where the curved portion is designed to act as a fulcrum point (against a wall) when one end of the tool is in contact with the leverage point. This bar can be carried separately from the device. In other embodiments, the device can include a holding mechanism for storing the tool when it is not in use. The tool can then be removed and used whenever the device is to be removed from a wall or other structure.

Various experimental devices and related uses are discussed hereafter. These experimental features provide support for numerous different embodiments and are not meant to be limiting.

FIG. 1 depicts a base unit for an experimental embodiment of a Multi-Purpose Weapon Holder ("MPWH") that includes an injection molded unit with two platforms (upper & lower) 102, 106 and a connecting unit 104 between the platforms, consistent with embodiments of the present disclosure. The surface of each platform 102, 106 can be configured with extra support structures to provide additional strength while minimizing weight and material cost. For instance, one or more of the platforms 102, 106 can be configured to include a center stabilizing bar 108 and a series of multiple (e.g., five) buttresses 110 on either side of the stabilizing bar 108. This design can be particularly useful for allowing the MPWH to be both lightweight and strong.

Figure 2:
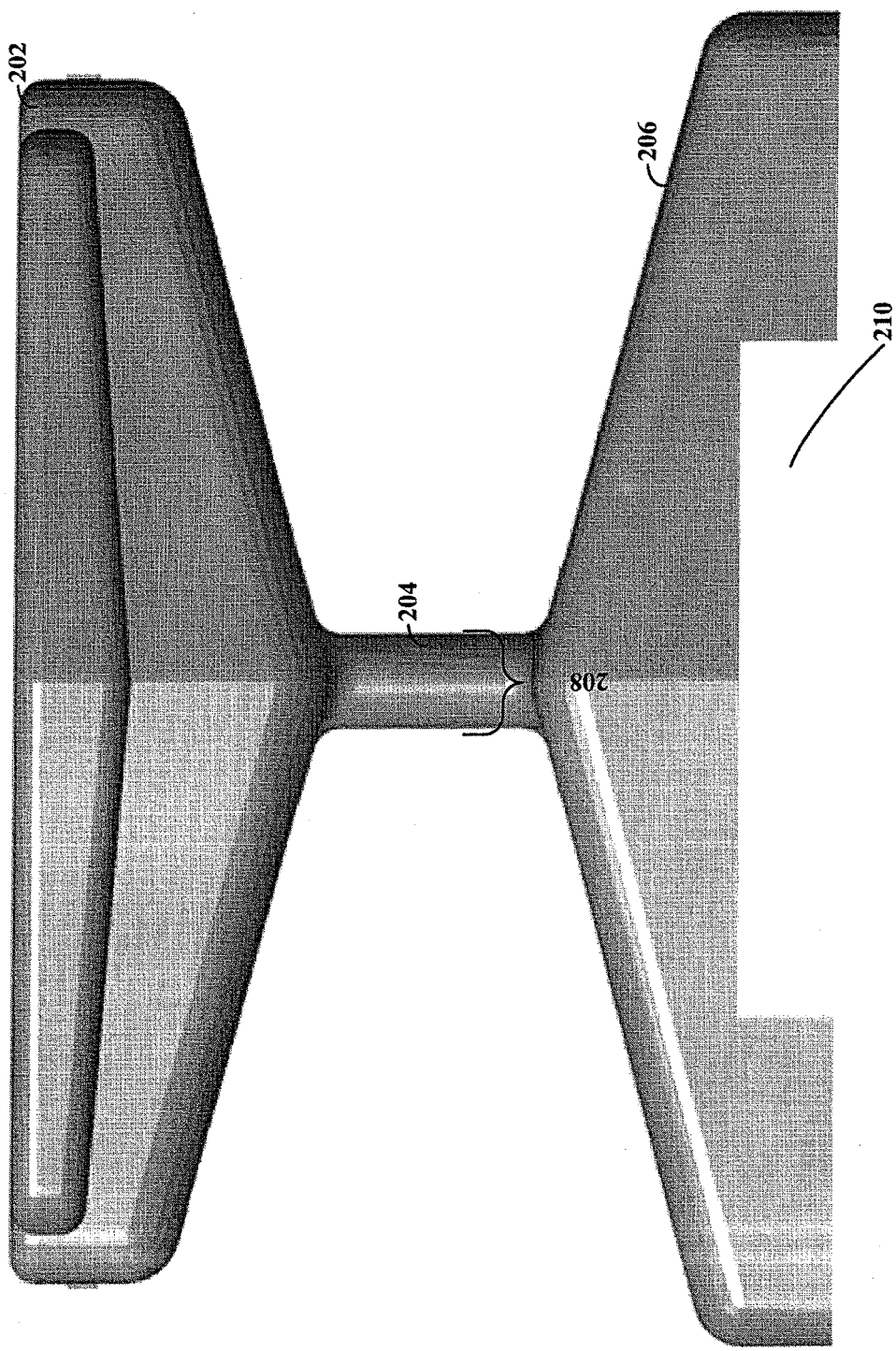
FIG. 2 depicts a side view of the MPWH in which the connecting/support unit between the platforms is shown, consistent with embodiments of the present disclosure.

FIG. 2 shows a side view of a base unit for the MPWH in which the connecting support 204 between the platforms is shown, consistent with embodiments of the present disclosure. The support 204 connects the two platforms 202 and 206. As shown, the support 204 can extend between the two platforms and in the direction not visible in FIG. 2, while being comparatively thin in the visible direction 208. This configuration facilitates gripping of the upper platform 202 while the device is attached to a structure at the lower platform 206. Moreover, the distance between the two platforms allows leverage to be applied with a rocking motion on the device, which can be useful for both securing the device to the structure and subsequent removal. Channel/slot 210 in the platform 206 can be filled with an adhesive-like material (e.g., hook and loop, Power-Grip Pedalboard, PaiGrip and/or 3M Dual Lock®) to permit attachment of the device to many different types of surfaces.

In certain embodiments, channel 210 is filled with a fastener material (not shown) that interfaces with another opposing material. This fastener material may be reclosable, adhesive-backed, flexible fasteners consisting of continuous fields of plastic stems with mushroom-shaped plastic heads, which tightly interlock when pressed together. For instance, PaiGrip or 3M Dual Lock® can be used as the fastener material. For example, a section of the Dual Lock material can be affixed to a wall at a desired location, while being sized and configured to interface with a corresponding section of the fastener material attached to the device.

Figure 3:
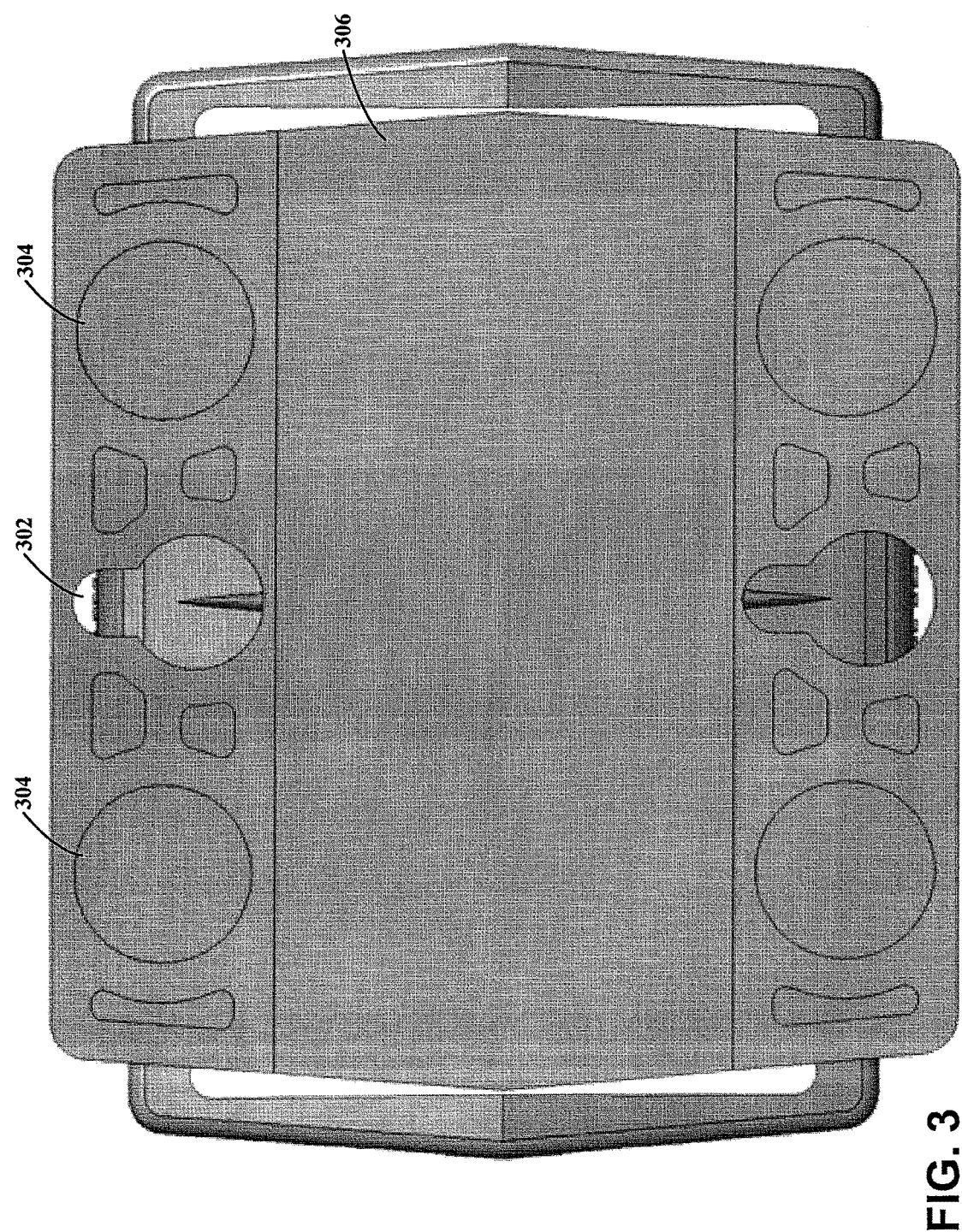
FIG. 3 depicts a view of the underside of the lower platform of the MPWH, consistent with embodiments of the present disclosure.

FIG. 3 shows the underside of the lower platform of the MPWH, consistent with embodiments of the present disclosure. The lower platform can be configured with one or more features designed to provide attachment options for securing the device to a wall or similar structure. As non-limiting examples, the attachment mechanism can include an adhesive-type material (e.g., hook and loop, Power-Grip Pedalboard, PaiGrip and/or 3M Dual Lock®), which is placed in a channel 306 that is located in the lower platform. The attachment mechanism can also be configured to adhere in the location of one or more key slots 302. In some instances, magnets can be placed in depressions 304. These attachment mechanisms can be combined with a gripping material, such as a material that is configured to resist shearing forces that are parallel to the support structure (e.g., downward pressure when attached to a wall).

Figure 4:
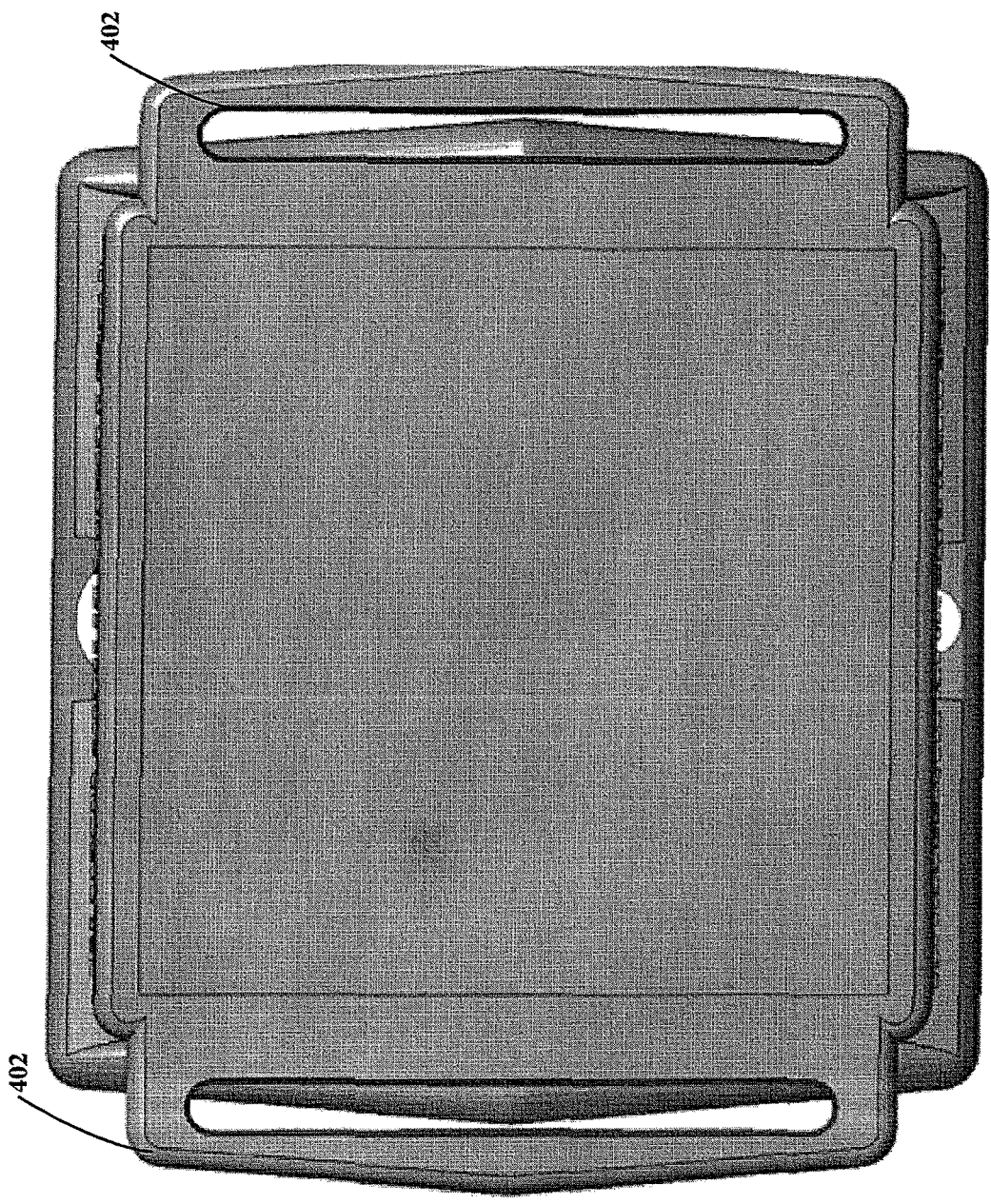
FIG. 4 depicts a top down view of the upper platform of the MPWH, consistent with embodiments of the present disclosure.

FIG. 4 shows a top down view of the upper platform of the MPWH, consistent with embodiments of the present disclosure. The upper platform can be configured to include extension elements 402 that serve dual purposes: providing a slot for inserting a strap or other attachment mechanism, and providing a graspable structure for the user of the device. In certain embodiments, a strap can be inserted into the slots of extension elements 402. This strap can include a Velcro strip or a snap that can be used for storing the device when not in use. This can be particularly useful for allowing a soldier to store the device on their clothing or carried equipment. The extension elements 402 can also facilitate attachment and removal of the device from a wall or other structure by providing a graspable extension for applying additional leverage, if necessary.

Figure 5:
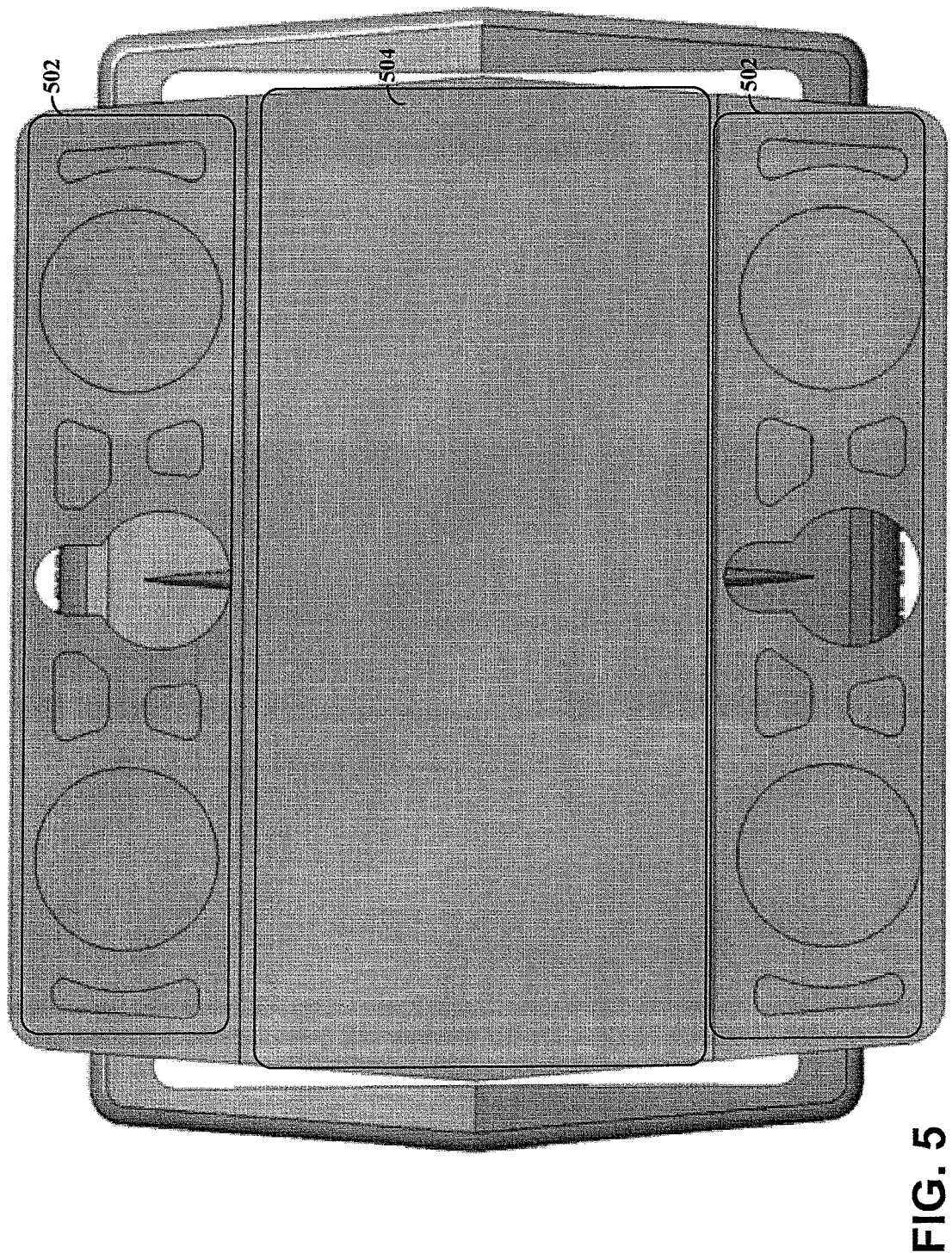
FIG. 5 depicts a top down view of the underside of the lower platform of the MPWH with an adhesive-like material and gripping material, consistent with embodiments of the present disclosure.

FIG. 5 shows a view of the bottom side of the lower platform of the MPWH with an adhesive-like material and gripping material, consistent with embodiments of the present disclosure. As shown in FIG. 5, adhesive-like material 504 can be placed in one or more slots. In certain embodiments the adhesive-like material can be a fastener material such as the 3M Dual Lock®. In other embodiments, the adhesive material may be in gel, liquid, foam or cream form, and may be reapplied as necessary. The location and configuration of the gripping material will depend upon the mechanical interface between the material's components. In one instance, the adhesive-like material can be placed in the center of the slot at location 504. The gripping material can be placed at locations 502. Other configurations are possible, including but not limited to, patterning of the gripping material and the adhesive-like material. In addition, various different types of adhesive materials can be used (e.g., the type of adhesive material being customized or tailored depending upon the different types of support structures or substrates). In certain instances, the gripping material can be placed within a recess of the platform. This can be particularly useful in the event that attachment is also provided through the use of one or more magnets that require close contact with a wall or similar structure.

Embodiments of the present disclosure allow for gripping material to be over-molded directly into the platform at locations 502 and 504. This can cover one or more of the recesses so as to provide additional surface area for the gripping material to interface with an attached surface. For example, the over-molding can cover all areas of the platform's surface—other than the locations of the two key slots and/or two magnets in opposite corners of the lower platform.

Consistent with certain embodiments, a directional gripping material can be applied to the lower platform. This can be particularly useful to ease removal of the device while providing gripping action in the most problematic direction. For instance, the gripping material could be oriented to resist downward movement caused by gravity, while allowing the device to easily slide in an upward direction for its removal from the structure.

Other embodiments of the present disclosure recognize that it may not be desirable to have multiple attachment mechanisms being used concurrently. For instance, if the MPWH device is placed on a ferromagnetic wall, the combination of a magnet coupled with an adhesive, may require a detachment force that exceeds the desired range (e.g., relative to human hand strength). Accordingly, certain embodiments of the present disclosure permit the user to temporarily disable one or more attachment mechanisms. As a non-limiting example, a thin (plastic) covering piece can be provided to cover the adhesive portion of the MPWH device. The covering piece can prevent the adhesive from sticking to a wall or similar structure, while still allowing another attachment mechanism, such as magnets, to operate as the primary attachment mechanism. The covering piece can also protect the adhesive portion from exposure to dirt or other contaminants which might be on the wall or in the air. The covering piece may also protect the adhesive portion from damage or wear while the MPWH is not in use. In one instance, this covering piece can be held in place by the adhesive portion itself. In other instances, the covering piece can snap or slide into place.

Figure 6:
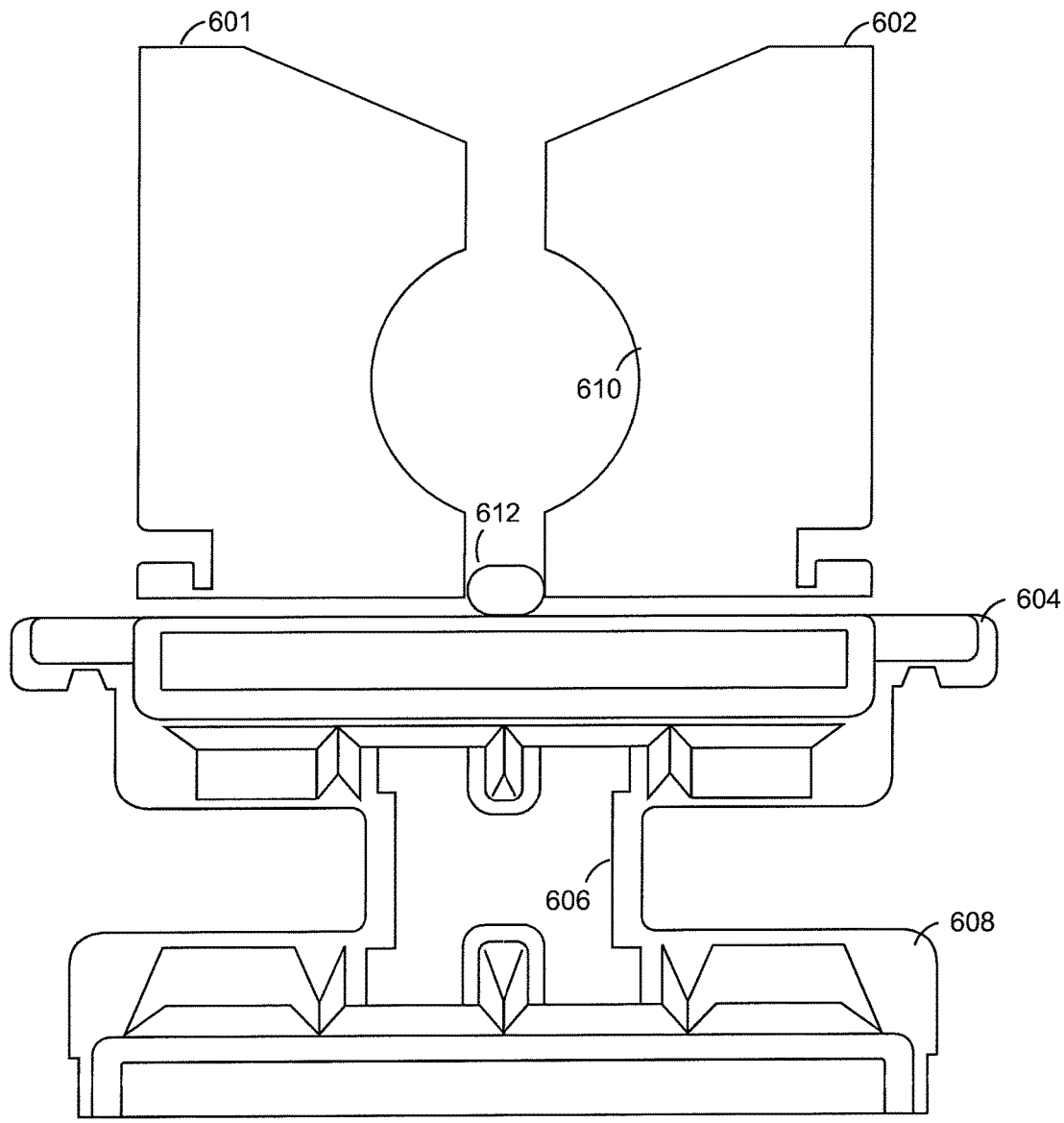
FIG. 6 depicts a front view of the MPWH in which a deformable component is attached to the upper platform, consistent with embodiments of the present disclosure.

FIG. 6 depicts a front view in which a deformable component is attached to the upper platform, consistent with embodiments of the present disclosure. FIG. 6 depicts elastically deformable components 601, 602 attached to the upper platform 604 of an MPWH device. The MPWH device can be attached to a wall or similar structure using attachment options located on the lower platform 608. Support unit 606 connects the two platforms.

Together, deformable components 601, 602 form a cavity 610 that is designed to secure the barrel of a firearm. For instance, an example dimension of about 0.75 inches diameter may be suitable for a 20 gauge firearm. These deformable components 601, 602 are configured to change position or shape in response to the barrel of a firearm being pressed into the opening. When sufficient pressure is applied, the deformation will be sufficient to allow the barrel of the firearm to enter the cavity 610. After insertion of the barrel, the deformable components 601, 602 return to their original shape and position and thereby hold the firearm within cavity 610.

With certain embodiments, the deformable components 601, 602 are configured to provide resistance sufficient to prevent a firearm from being dislodged from the opening 610 by expected forces (e.g., by movement of a vehicle/vessel or by light jostling from people or objects). The use of an optional strap can provide further resistance. Moreover, the force required to dislodge the firearm from the MPWH device can be set to a value that is less than the force required to remove the MPWH device from support structure. This allows a person to use the firearm without removing the MPWH device from the wall or other structure. For instance, the size of the cavity 610 can be changed to increase or reduce the resistance. In addition, the type of material of the deformable components 601, 602 can be modified. This can include the use of deformable components that are designed to keep the MPWH on the barrel in a more permanent fashion. In particular, the required removal force can be set at a relatively high level, such that the MPWH can be removed from an attached structure by pulling on the firearm.

Particular embodiments of the present disclosure relate to different materials and/or structures for the deformable components 601, 602 in order to provide different resistances depending on whether the firearm is being inserted or removed from the cavity 610. For instance, a directional adhesive material can be used to facilitate insertion of the firearm into the device, while at the same time resisting removal of the firearm.

The device depicted in FIG. 6 can also include (optional) material 612, which is located between the deformable components 601, 602. In certain embodiments, this material can be configured to facilitate use of a firearm while the barrel stays positioned between the deformable components. For instance, the material 612 can be designed to provide stability to the firearm during aiming and also cushion the barrel from impacts caused by firearm recoil.

In certain embodiments, the deformable components 601, 602 and the material 612 can be designed such that the firearm does not normally touch the material 612 unless significant force is applied to the firearm in the direction toward the material 612. This type of force may be caused, for example, by the firearm recoil.

The exterior edges of the top surface of the upper platform form a frame to create a short well or depression on the top of the platform. The well can be used to seat and attach deformable elements, such as a 2"×2"×1.75" sheath of flame-retardant, closed cell, polyethylene foam. The foam can be attached to the platform with either appropriate liquid glues or double-sided foam tape. The foam sheath can thereby be used to accommodate and protect the barrels and sights of a weapon.

Figure 7:
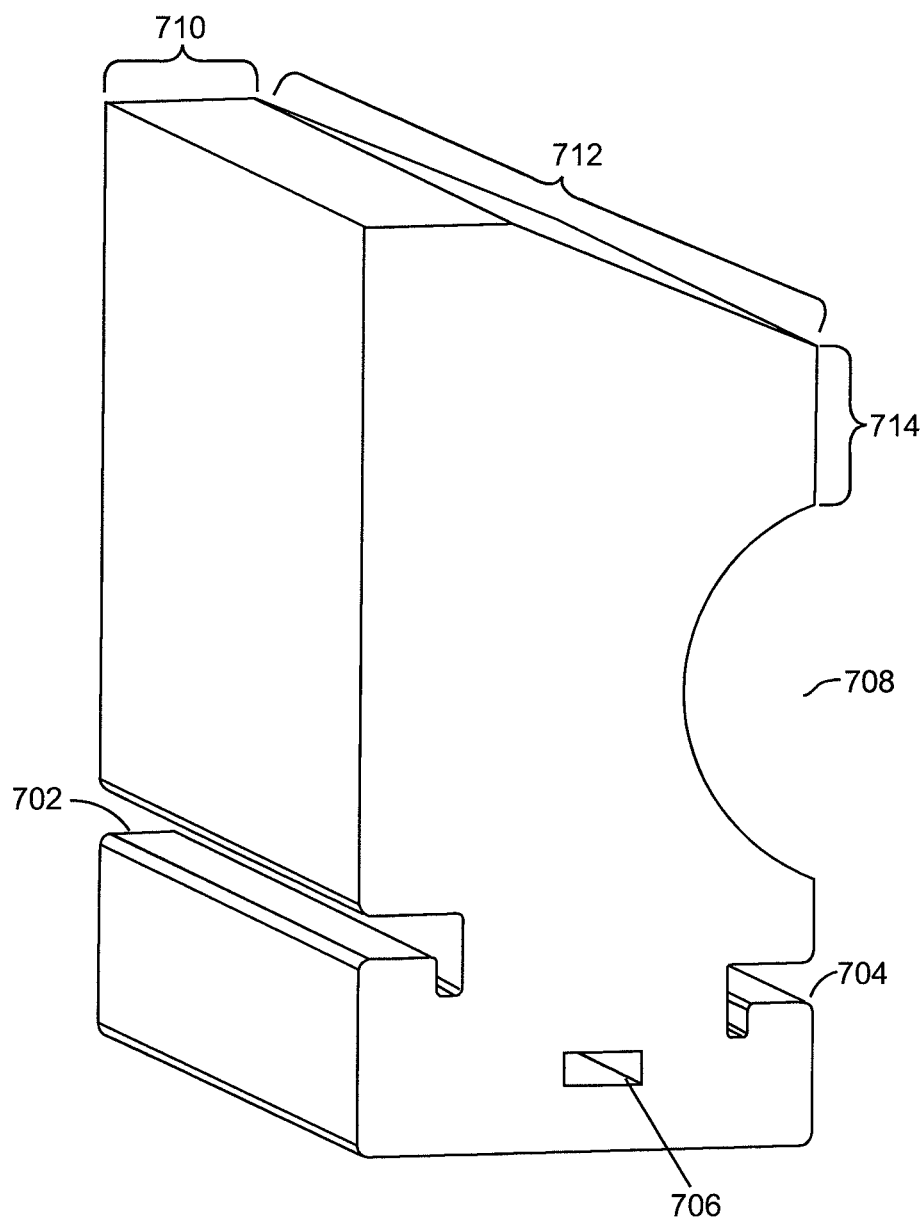
FIG. 7 depicts a deformable piece that is configured and arranged to be used with an MPWH device, consistent with embodiments of the present disclosure.

FIG. 7 depicts a deformable piece that is configured and arranged to be used with an MPWH device, consistent with certain embodiments of the present disclosure. Similar to the design shown in FIG. 6, two deformable pieces can be positioned to create a cavity 708 that can accommodate the barrel of a firearm.

As discussed herein, one or more deformable pieces can be attached to base unit using adhesive materials. The deformable piece depicted in FIG. 7 also includes a number of connection points that facilitate other attachment mechanisms. For instance, the base unit can have openings or structures that mate with (and secure) the deformable piece. This can include structures that mate with "L" grooves 702, 704 and channel 706. Corresponding structures (e.g., "tabs" and/or "rails") on the base unit can fit within such grooves and channels and thereby secure the deformable piece(s) to the base unit. In particular embodiments, the deformable piece is configured to snap/slide into place. Such features have been discovered to be particularly useful for achieving manufacturing efficiency on a large scale. In comparison, adhesives can be more labor intensive and more prone to quality control challenges. Moreover, features such as those shown in FIG. 7 can be more readily produced by using (fully or partially) automated assembly procedures.

Consistent with certain, non-limiting embodiments, the L-shaped grooves 702, 704 are fabricated in each deformable piece as a 2" long groove. Consistent with certain embodiments, the base unit can include molded plastic rails which are shorter (e.g., 1.5" long). The (0.5") difference in length allows the molded plastic rails of the platform to remain protected by the outside edges of the deformable piece(s) (because of the 0.25" overhang of the deformable pieces beyond each end of the rail). According to various embodiments, a channel 706 can be configured as a rectangular opening that measures around 0.150"×0.062".

Large scale use of MPWH devices by military organizations is facilitated by the use of modular components that can be readily replaced, changed and supplemented. For instance, certain types of foam can deteriorate when exposed to ultra-violet rays from sunlight, and the damaged foam may need to be quickly and securely replaced. The MPWH device can be configured and arranged to allow a soldier to quickly replace part or all of the deformable pieces while in the field, and without tools.

The use of deformable pieces that can snap/slide into place can be particularly useful in this regard. For instance, damaged deformable pieces can be easily removed and replaced without having to scrap the entire MPWH device. Moreover, the deformable pieces can be upgraded or changed to accommodate new weapons or to change the color (e.g., for camouflage purposes specific to a new deployment location).

Certain embodiments are directed toward the use of deformable pieces that are nearly identical. This can be particularly useful for simplifying manufacturing and replacement of the deformable pieces. For instance, a single, spare deformable piece can be kept on hand for use in the event of damage to either one of the current deformable pieces.

Other embodiments recognize that two different types of deformable pieces can be used together. For instance, deformable pieces with different stiffness can be used in combination. This can allow for different levels of support to be provided for the firearm. Moreover, one deformable piece can provide a solid and less pliable platform, while the other deformable piece facilitates insertion and removal of the firearm by being more pliable and/or less firm. As an example, the MPWH device can be placed upon a wall at an angle that causes the weight of the firearm to rest on the solid deformable piece. The solid deformable piece can even be horizontal. The higher stiffness of one of the pieces can help support the weight of the firearm, while the more pliable nature of the other piece facilitates the insertion and removal of the firearm. In certain situations, one of the pieces can be substantially non-deformable (e.g., a rigid plastic or metal material). The other, opposing piece can be sufficiently pliable to still allow a firearm to be inserted and removed.

Consistent with certain embodiments, the deformable pieces can form a replaceable foam sheath made from specially fabricated, flame-retardant, closed cell, polyethylene foam. The foam can be specially formulated for the MPWH to meet or exceed military and UL fire retardant requirements and ratings. These types of ratings often apply to equipment aboard military ships and airplanes.

In certain embodiments, the deformable pieces form a sheath to protect and secure the firearm. The two-piece design of the sheath facilitates the use of different foam configurations for accommodating different weapons with different barrel sizes. The two-piece design can also facilitate various combinations of different fabrications and different densities of foam for the two opposing pieces. The features fabricated into each section of the sheath serve one of two general purposes, attachment or performance.

Although additional variations are contemplated, particular embodiments can be designed with one or more of the following dimensions. When secured, the top 710 of each deformable piece can be flat from the outer corner toward the midline for a distance of about 0.285". At this point, the deformable piece can be angled downward (712) at 22.625 degrees toward the center of the sheath. The flat section/top 710 may provide a useful surface for accommodating the force of a strap that may rest upon the deformable piece while securing a firearm. For instance, by increasing the effective surface area of the interface between a strap and the deformable piece, the force of the strap can be distributed over a larger area.

In certain embodiments, an angled midline 712 can be useful for serving as an entry point for the barrel of the weapon as it is inserted into the cavity 708. A flat section 714 can extend for about 0.297" above the cavity 708. This flat section 714 can be particularly useful for extending the life of the deformable pieces. For instance, a pointed corner at this location could be prone to breakage due to interference with the strapping system or the barrel of a weapon.

The cavity 708 can be sized and configured to house the barrel of the weapon. For instance, the radius of the circle/cavity 708 can be 0.250". When both of the deformable pieces are secured in the MPWH device, the diameter of the circle can be 0.750", which is 0.250" more than the combined radii of the cavities 708. The additional 0.250" is due to the distance between the deformable pieces once they are secured in the MPWH. In certain embodiments, the distance between the deformable pieces is created by a raised portion or ridge that provides the physical separation. This added 0.250" spacing also appears at both the bottom and the top of the cavity 708. The 0.250" space created at the top of the circle 708 allows the barrel to enter the circle. The dimensions of the angles and the radius of the circle are particularly useful for accommodating many US and NATO non-crew served weapons; however, they can also be adjusted to accommodate different barrel sizes.

Figure 8:
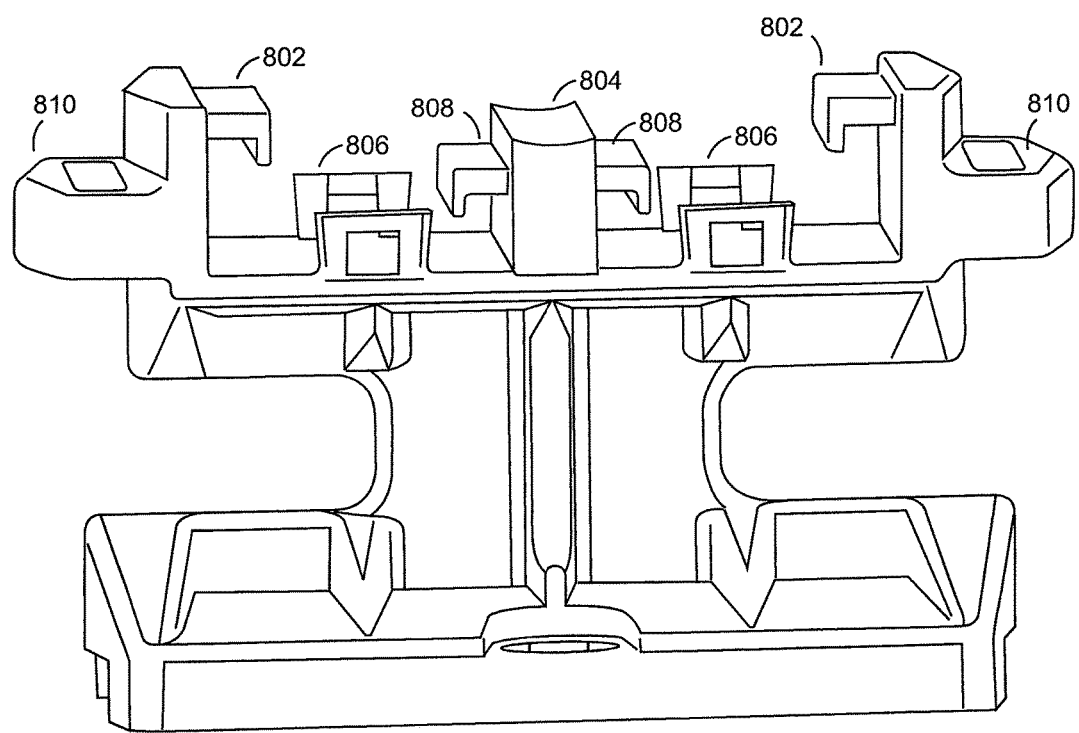
FIG. 8 depicts a front view of a base unit with attachment structures, consistent with embodiments of the present disclosure.

Optional text, such as safety instructions, can be molded into the sides of a platform, as shown in FIGS. 6 and 8. The section of the mold containing the instructions may consist of a removable plate that can be changed to provide different instructions, even different languages (sometimes referred to as a "slug").

FIG. 8 depicts an alternate view of a base unit having multiple attachment structures, consistent with certain embodiments of the present disclosure. The upper platform of the MPWH can include several specialized components, each with its own function. These specialized components can include attachment/securing rails 802, 808, securing tabs 806, the Center Ridge Support (CRS) 804 and handles 810. The barrel of a weapon can be secured to the MPWH when these components are used in conjunction with the deformable piece(s) and/or with a (Velcro) strapping system. For example, attachment rails 802 can be configured and arranged to fit into the L-shaped groove 702 (shown in FIG. 7), while attachment rails 808 can be configured and arranged to fit into the L-shaped groove 704. Similarly, tabs 806 can be configured and arranged to fit within channel 706.

The CRS 804 bisects the upper platform. In certain embodiments, the top of the CRS 804 is concave and is over-molded with a non-skid gripping material, such as a 3M Gripping Material. This design conforms to the shape of and allows the barrel of a weapon to nest on top of the CRS 804. The non-skid material (resin) can help to prevent the weapon from sliding forward or backwards. The CRS 804 can also be configured to include securing rails 808, one on each sidewall of the CRS. The securing rails 808 may be part of a comprehensive foam securing system designed to hold in place deformable components (e.g., foam pieces) in the upper platform.

FIG. 8 depicts four different attachment rails 802, 808. Consistent with certain embodiments, the attachment rails 802, 808 are molded, L-shaped rails that run parallel to each other. They can be specially designed to fit into L-shaped grooves/slots 702, 704 in the deformable pieces. In other words, the L-shaped grooves/slots 702, 704 are designed to slide/snap over the attachment rails 802, 802, which then become locked into place. The deformable pieces can still be removed; however, a significant amount of force may be required for such removal.

The L-shape shown in FIG. 8 is but one example of possible shapes and attachment solutions. For instance, the MPWH can be designed to a T-shape or saw tooth shape for locking attachments. Moreover, the attachments can have different angles for insertion. For instance, the attachment rails 802, 808 can be angled upwards at a 45° angle relative to the sidewalls, and have a saw tooth, T- or L-shape. The deformable pieces can have corresponding grooves or openings. The use of such an angle can both facilitate insertion and allow for additional thickness in the base of the deformable pieces.

As non-limiting examples, each side of the upper platform can include an attachment rail 808 that extends from the sidewall of the CRS 804. The other attachment rail 802 is attached to the inside of the upper platform's end wall. The heights of the attachment rails 808 can be offset to provide additional support to the deformable pieces. For instance, the attachment rails 802 attached to the end walls can be placed higher to secure the outer edges of the sheath within the upper platform. Together, the attachment rails 802, 808 on the CRS 804 can secure the lower midsection of the sheath creating a strong, yet flexible, center connection.

Tabs 806 may have a wedge-like shape that is designed to securely fit into a strategically placed rectangular core or channel 706 in the deformable piece. This combination of attachment elements helps to secure the foam in place to withstand forces from all directions.

Although additional variations are contemplated, particular embodiments can be designed with one or more of the following dimensions. In certain embodiments, the overall (outside dimensions) height can be around 1.8". The height from the bottom platform to where the deformable pieces are situated can be about 1.305". In embodiments where the deformable pieces are about 1.750", the total height of the MPWH can be about 3.055". When measured along the CRS 804, the upper platform can be about 2.250" at the outer dimensions. The outer dimensions of upper platform when measured handle to handle can be about 3.072" at the outer dimensions. The overall size of the lower platform, measured in the direction of the recessed channel 906, can be about 2.696". The overall size measured perpendicular to the recessed channel 906 width can be about 2.500". These sizes are provided as examples and are not meant to limit all embodiments.

The CRS 804 can also be designed to provide a 0.25" space between the two deformable pieces. With straight-lined deformable pieces, there will be a 0.25" gap between the two pieces of the sheath at the top. The resulting opening between the deformable pieces allows a soldier to easily push the barrel of the weapon in a downward motion to securely seat the barrel in the circular opening of the deformable pieces. Optional angled portions in the deformable pieces can be included to guide the weapon into the gap. In particular embodiments, when the barrel is secured, the top of the CRS 804 remains about 0.125" below the bottom of the circular opening and the barrel.

Consistent with certain embodiments, an MPWH device can be configured to include slotted handles 810 that extend from the outer edges of each end of the upper platform. The slots can be designed to accommodate a strapping system that can serve a number of purposes, including securing a weapon within the MPWH device. For instance, the slots can be 1.75" wide and 0.150" thick to accommodate a strap of slightly smaller dimensions. The handles 810 can also been designed to withstand forces necessary to disengage the MPWH device when engaged with a surface (e.g., with adhesives, Dual Lock or magnets). A soldier can disengage the MPWH by pulling in an upward motion directly on a handle or the strap.

Various embodiments are directed toward a strapping system, which can use flame-retardant Velcro or another attachment material that meets military specifications. The flame-retardant properties can be particularly useful for use on ships and aircraft. In certain instances, the strap can be 1.5" wide and 10.625" long. A black molded plastic D Ring can be attached (e.g., heat welded) to one end of the strap. The other end of the strap can be rounded to prevent injuries from sharp edges. Extending six inches from the D ring, the strap is fabricated from Velcro-type loop material. Four inches of Velcro hook material can be attached (e.g., heat welded) to the end of the loop material.

To secure a weapon in the foam sheath, the strap can be fed through one of the slotted handles 810, placed over the top of the foam sheath (not shown in FIG. 8), and then down through the other, second slotted handle. When the strap is pulled tight, the D ring can be designed to rest directly against the underside of the handle 810. To secure the strap, the rounded end is pulled tight and placed against the loop material over the sheath. To release the strap, the rounded end is pulled in an upward direction.

In addition to securing a weapon in the MPWH, the strap can be used to disengage the MPWH by pulling the strap in an upward motion when the unit is fastened to a support structure by Dual Lock or magnets. The strap can also be used to fasten the MPWH to a soldier's vest and to stack arms during training. When not in use, the strap can be efficiently folded and stored between the upper and lower platforms of the MPWH.

Figure 9:
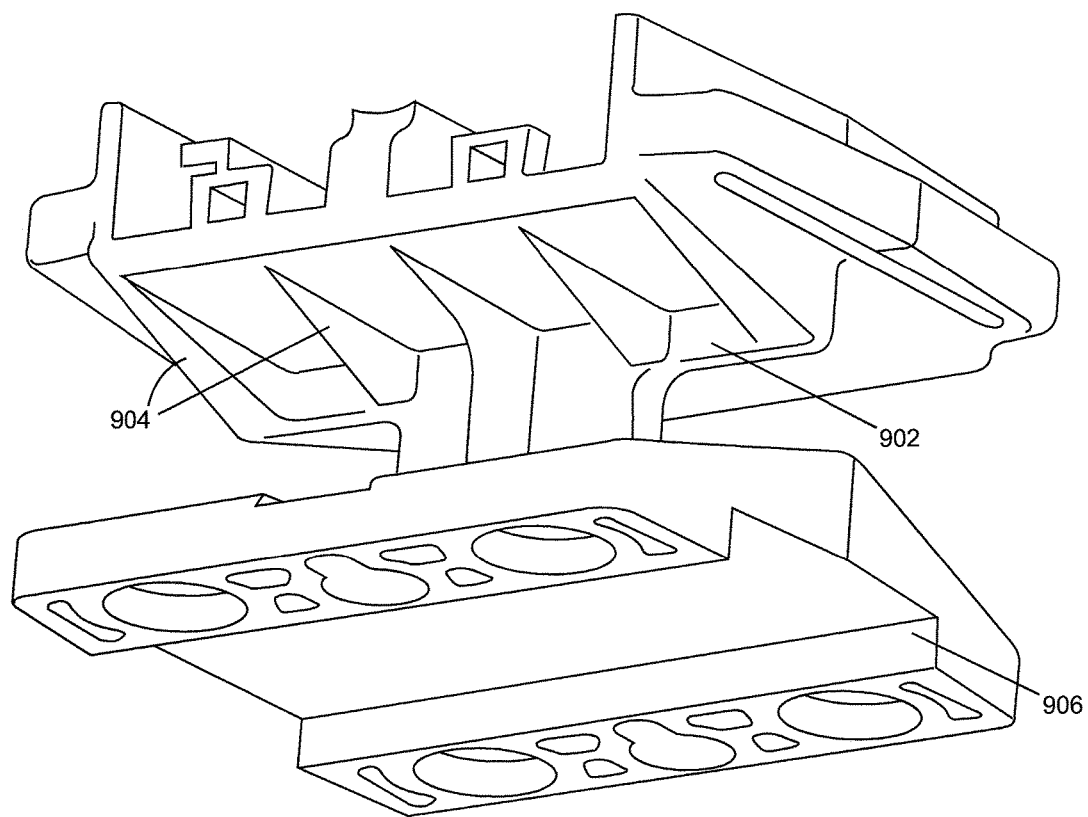
FIG. 9 depicts the underside of the upper platform, consistent with embodiments of the present disclosure.

FIG. 9 depicts the underside of the upper platform, consistent with embodiments of the present disclosure. The underside of the upper platform has a center stabilizing bar 902 that can run the length of the platform between the slotted handles. In certain instances, the stabilizing bar 902 can provide structural support for the upper tray or platform. The stabilizing bar 902 can also include a total of ten buttresses 904 (five on each side) extending in directions perpendicular to the length of the stabilizing bar 902. The buttresses 904 can provide structural support for and strengthen the outer edges of the tray. Recessed channel 906 can include one half of a reclosable fastener system.

Similarly, the upper surface of the lower platform can also have a stabilizing bar running the length of the platform. A total of ten fingers/buttresses connect to the stabilizing bar, five on each side. The buttresses provide support for and strengthen the lower tray or platform. The center buttress on both sides of the stabilizing bar is shortened to allow for the placement of key slot attaching mechanisms in the center of both sides of the platform. The shortened buttresses also serve as a connecting point for one section of the connecting stem.

This design can be particularly useful for an MPWH device that is both lightweight and strong enough to withstand the stresses caused by engagement and disengagement of its attaching mechanisms (e.g., Dual Lock, magnets, etc.).

Figure 10:
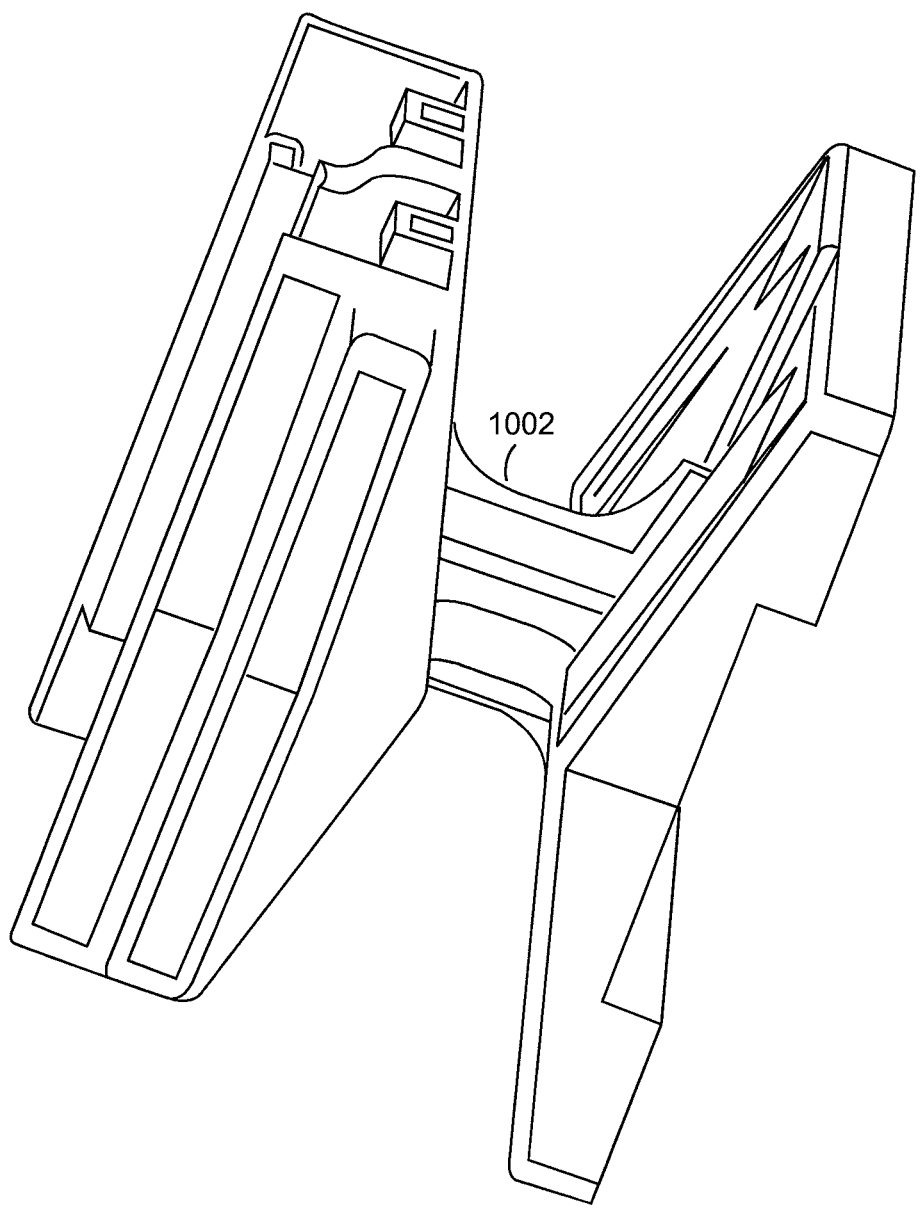
FIG. 10 depicts the support structure between two platforms, consistent with embodiments of the present disclosure.

FIG. 10 depicts a view of the support structure between two platforms, consistent with embodiments of the present disclosure. The support (stem) structure 1002 can be designed to provide additional structural support while still permitting the MPWH device to be lightweight. Accordingly, the support structure 1002 can be designed with support flanges that extend along different directions of the platforms. For instance, the flanges can be configured and arranged in a "+" or "X" shape in which the flanges extend in four different directions. This can provide a significant amount of additional strength, but is less weight than a solid square or rectangular shape of material. One section of the stem can also be connected to the center stabilizing bars of both the upper and lower platforms. The other section of the stem can connect to the center buttress on both sides of the stabilizing bars on both platforms. All four flanges of the connecting stem can be designed to be relatively wide at the point of connection to each platform, allowing pressure to be dispersed from above or below.

Figure 11:
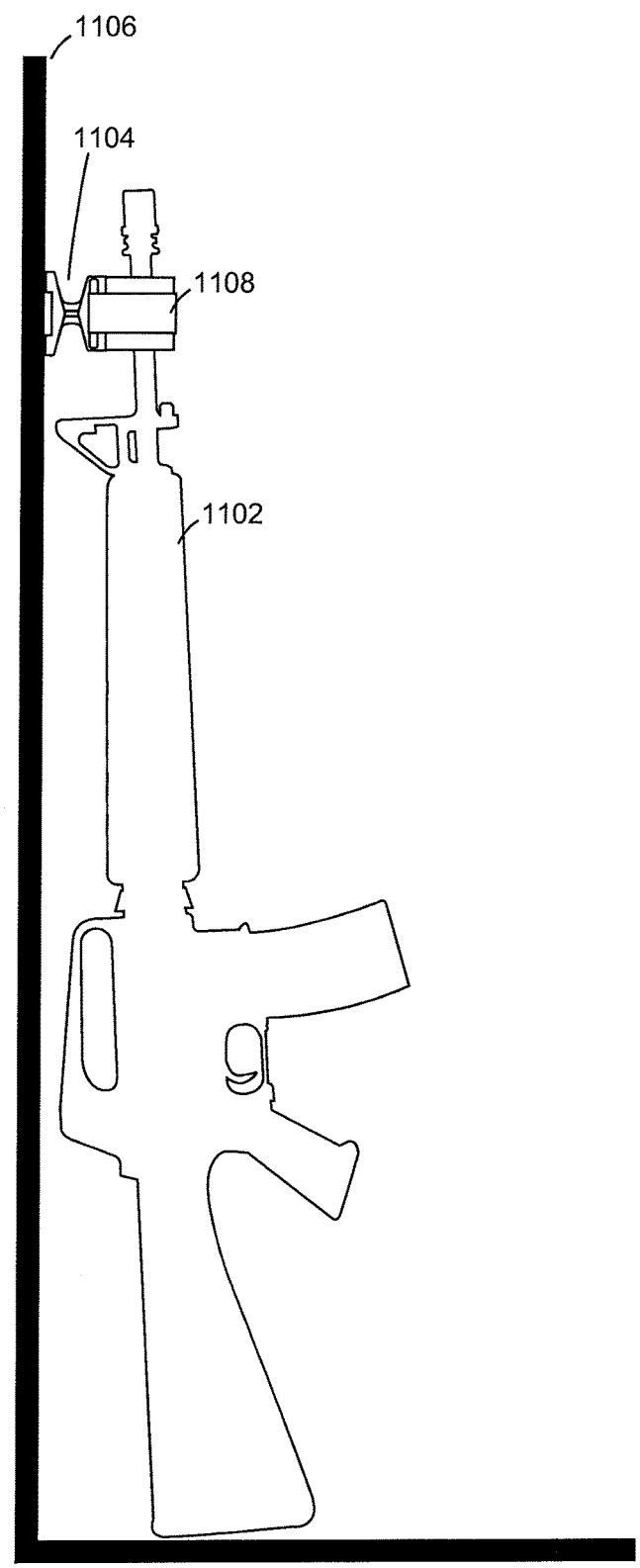
FIG. 11 depicts the use of an MPWH device to secure a firearm against a structure, consistent with embodiments of the present disclosure.

FIG. 11 depicts the use of an MPWH device to secure a firearm against a structure, consistent with embodiments of the present disclosure. Firearm 1102 is shown being secured against a structure 1106. The structure 1106 can be any number of different structures including, but not limited to, a wall of a building. FIG. 11 depicts structure 1106 as being substantially vertical; however, the structure can be at various angles relative to a level surface (such as the floor of a building). For instance, the firearm 1102 can be secured to the floor (0°), wall (90°) or other structures having a variety of different angles.

MPWH 1104 can secure the firearm 1102 by containing the barrel within deformable portions. In certain optional embodiments, a strapping system 1108 can be used to further secure the firearm 1102. MPWH 1104 can be secured, in turn, to the structure 1106 by various different attachment solutions, some of which are discussed in more detail herein.

MPWH 1104 may have a two-platform design that can facilitate placement and removal from the structure 1106. This two-platform design includes, but is not limited to, handles with open gripping space where a thinner support structure or stem connects the two platforms. The stem allows for the application of leverage at the point of the handles in order to apply and disengage the securing mechanisms on the structure 1106.

Figure 12:
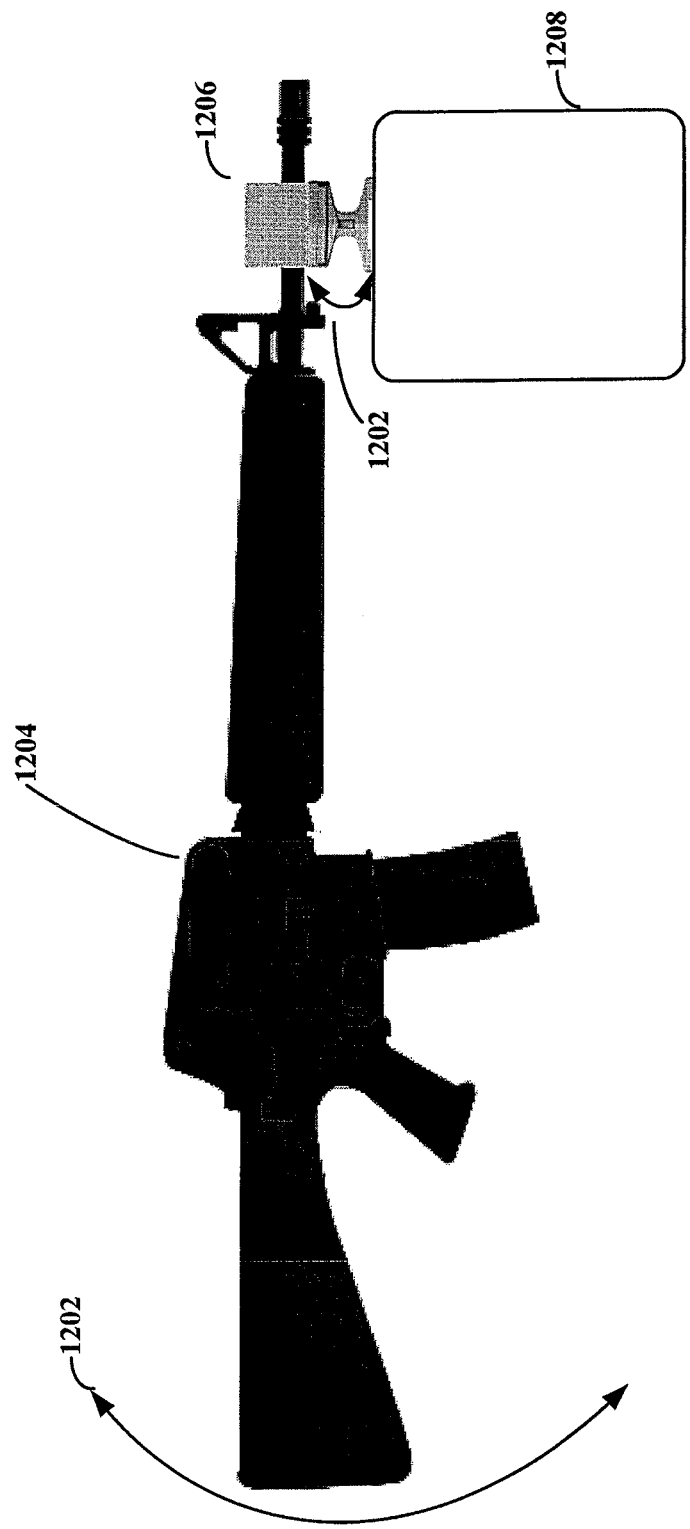
FIG. 12 depicts the use of an MPWH device to stabilize a firearm during aiming or sighting of the firearm, consistent with embodiments of the present disclosure.

FIG. 12 depicts the use of an MPWH device to stabilize a firearm that is being aimed or sighted, consistent with embodiments of the present disclosure. Firearm 1204 is secured within MPWH 1206, which rests upon a structure 1208. When firearm 1204 is discharged, the weapon recoil can result in an impact between the weapon and any structure upon which the barrel rests. If the structure 1208 is hard, this impact can damage the weapon and/or the structure. Thus, it can be undesirable for the structure 1208 to be relatively hard, as may be the case with materials such as metal, wood, rock, glass or other hard or brittle materials. As discussed herein, MPWH 1206 can be configured to cushion the firearm 1204 and thereby permit the structure 1208 to be made of any number of different materials, including relatively hard materials.

Moreover, MPWH 1206 can be designed to facilitate canting of the firearm as indicated by arrows 1202. For instance, when the MPWH has a two-platform design, the height provided by a support structure or stem connecting the two platforms can facilitate the rotation of the MPWH 1206 on the structure 1208. Such canting can also be facilitated by rounding the edges of the bottom platform and/or by providing a raised portion upon which the MPWH 1104 can pivot.

Figure 13B:
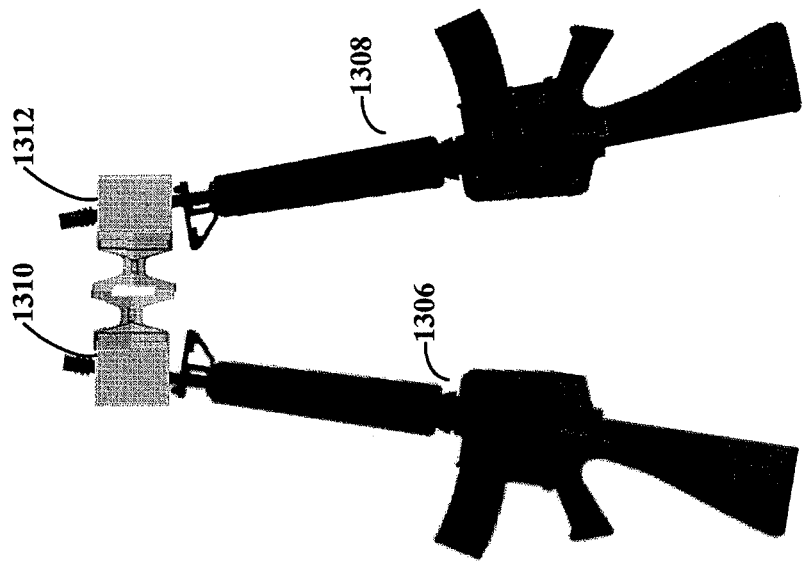
FIG. 13B depicts a view of a component for securing to MPWH devices to one another for stacking of arms, consistent with embodiments of the present disclosure.
Figure 13A:
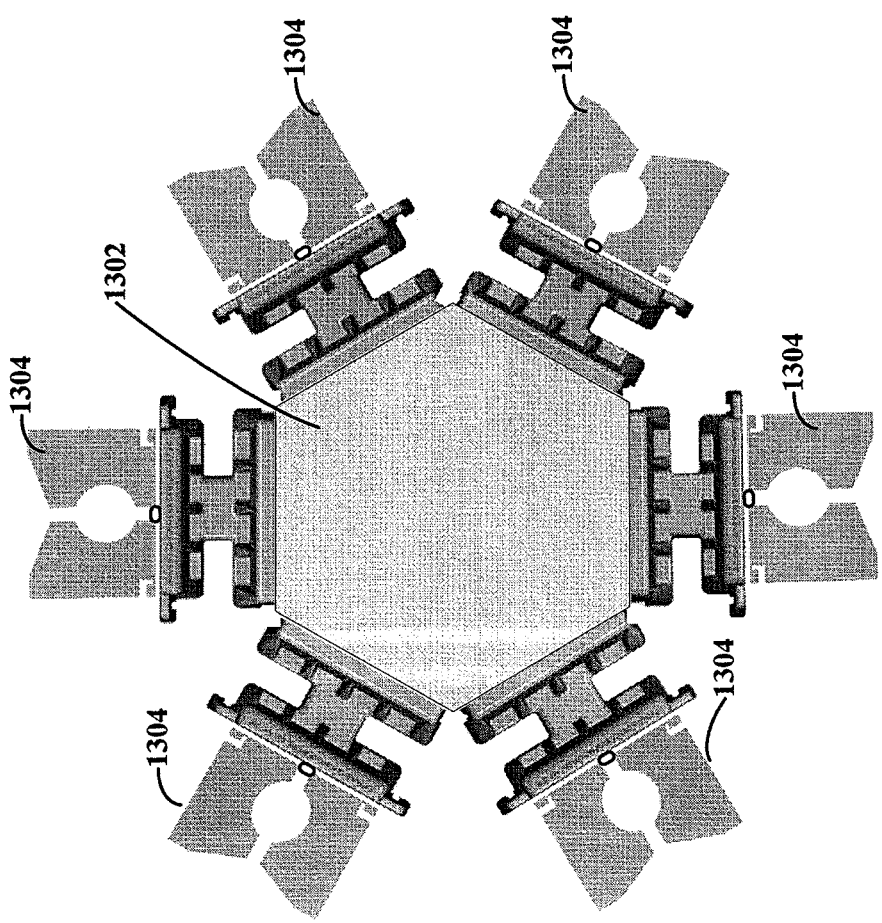
FIG. 13A depicts a view of a component for securing multiple MPWH devices to facilitate stacking of arms, consistent with embodiments of the present disclosure.

FIG. 13A depicts an apparatus for securing multiple MPWH devices to facilitate stacking of arms, consistent with embodiments of the present disclosure. Component or apparatus 1302 provides a number of interfaces upon which MPWH devices 1304 can be attached. For instance, apparatus 1302 can have a flat, central plastic piece surrounded by multiple pegs that fit within key slots on the MPWH devices 1304. (Other attachment solutions are also possible). Two or more MPWH devices 1304 can then be attached to the apparatus so that multiple firearms can be held upright by counterbalancing themselves against one another. In this manner, apparatus 1302 and the MPWH devices 1304 can function as a free standing firearm securing system that can be located virtually anywhere. This can be particularly useful for storing and keeping the firearms off the ground where there are few (or no) suitable support structures for attachment of an MPWH device 1304. The particular hexagonal shape of component 1302 as shown in FIG. 13A is not limiting, and other shapes are possible including, but not limited to, squares, circles, pentagons and octagons.

FIG. 13B depicts a method of stacking multiple arms using multiple MPWH devices, consistent with embodiments of the present disclosure. Firearms 1306 and 1308 can be used to counterbalance one another in a freestanding configuration by securing two MPWH devices 1310, 1312 to each other. In certain embodiments, the two MPWH devices 1310, 1312 can be secured to one another using strapping systems (not shown in FIG. 13B).

In other embodiments, the two MPWH devices 1310, 1312 can be provided with magnets, and the two devices 1310, 1312 can be connected by aligning their respective magnets to enable a magnetic attraction. This alignment can be facilitated by manufacturing the MPWH devices 1310, 1312 with specific alignment of north and south magnetic poles. For instance, each MPWH 1310, 1312 can be configured with two magnets in opposite corners and with different north or south poles exposed. In other instances, metallic plugs can be placed in one or more remaining recesses in the bottom platform. The magnetic attraction between the magnets of the opposing MPWH devices 1310, 1312 and the metal plugs can hold the MPWH devices to one another. In certain embodiments, two strips of a reclosable fastener system can be placed back-to-back. The opposing MPWH devices 1310, 1312 can then each be connected to a different side of the back-to-back strips of a reclosable fastener system.

Figure 14:
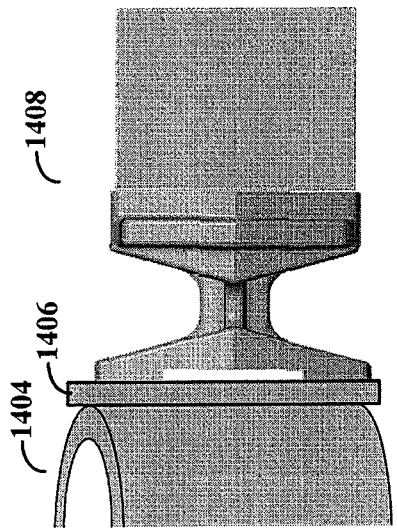
FIG. 14 depicts an MPWH with a non-planar attachment surface, as well as the attachment surface, consistent with embodiments of the present disclosure.
Figure 14:
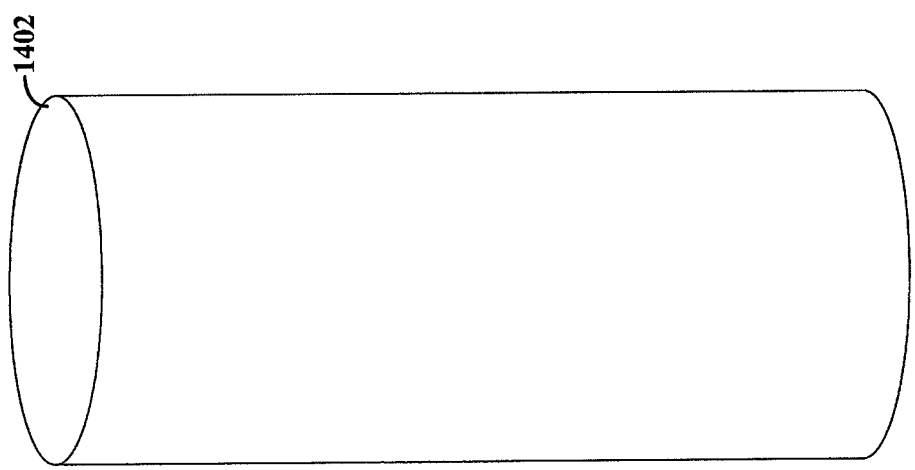

FIG. 14 depicts a MPWH device having a non-planar attachment surface, consistent with embodiments of the present disclosure. The non-planar attachment surface is sized and configured to correspond with the size and shape of a support structure 1402. Embodiments of the present disclosure are directed toward the use of an attachment surface for the lower platform that is specially designed in non-planar configurations for attachment to different surfaces. For instance, it may be desirable to attach an MPWH device to a curved surface (such as a round pole 1402) or to an angled surface (such as the corner of a building). Consistent with certain embodiments, customized MPWH devices may have a lower platform that has the desired shape, whether curved, angled or otherwise. FIG. 14 depicts alternate embodiments where an MPWH device 1408, having a relatively planar lower platform, is modified by adding an attachment surface 1404 that has the desired shape (depicted in FIG. 14 as curved). An interface piece 1406 can connect the attachment surface 1404 to the MPWH device 1408.

Figure 15B:
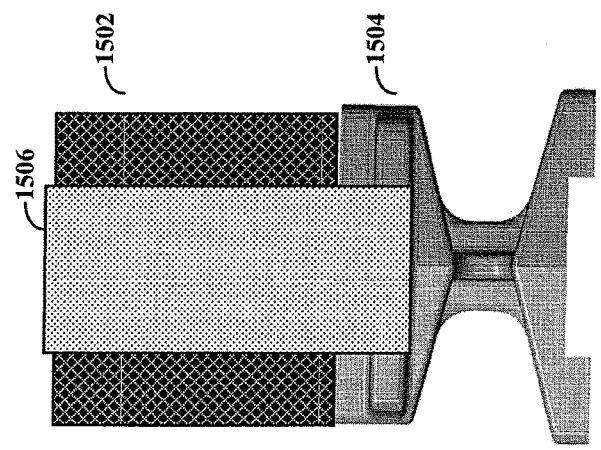
FIGS. 15A and 15B depict a protective cap for placement over a deformable component when not in use, consistent with embodiments of the present disclosure.
Figure 15A:
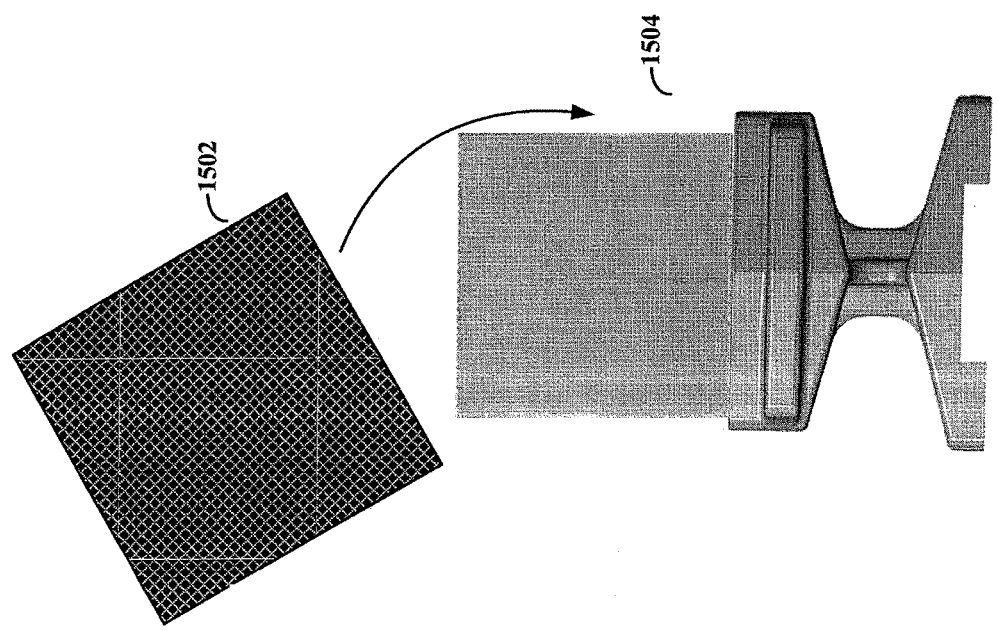

FIGS. 15A and 15B depict a protective cap for placement over the deformable portions when not in use, consistent with embodiments of the present disclosure. The deformable portions of MPWH 1504 can be particularly susceptible to physical damage. For instance, many deformable materials can be broken, chipped or permanently bent. Moreover, certain deformable materials can degrade with exposure to natural elements, such as sunlight or water. Accordingly, a protective cap 1502 can be provided to cover the deformable portion(s) when not in use. In certain embodiments, this protective cap 1502 can be attached using the strapping system 1506; however, other attachment solutions are possible (e.g., a center piece within the cap 1502 that fits within the deformable portion's aperture like the barrel of a firearm).

The following discussion provides further details of one or more experimental embodiments and is not necessarily limited to any particular embodiments discussed herein.

In one embodiment, the MPWH can be molded using a mixture of (virgin) ABS resins and fiberglass (e.g., at a ratio of 80% resin and 20% fiberglass). In one embodiment, the MPWH can be molded using a mixture of nylon and fiberglass (e.g., at a ratio of 70% resin and 30% fiberglass). This can be particularly useful for providing suitable strength. The use of nylon can provide extra flex, which can help accommodate stresses. The exterior surfaces of the MPWH can be heavily textured to achieve a sandpaper-like texture for easy gripping even in wet conditions. The device may also include a stealthy matte finish that will not reflect light. Various components of the MPWH can be designed to function in extreme temperature ranges to assure proper functioning, whether being used in Arctic or desert conditions.

Embodiments of the present disclosure recognize that the MPWH can be used to secure a weapon/firearm on vertical, horizontal and sloped planes or support surfaces. Moreover, the MPWH can be secured to almost any surface. The MPWH allows the user to stabilize a weapon for zeroing in on a target (sighting) in both stationary and moving environments. The MPWH also provides a stable platform for performing weapon cleaning and maintenance. In certain embodiments, the supporting piece or stem between the two platforms can be a moveable joint (e.g., a swivel or ball joint), which allows the weapon to be rotated relative to the device's bottom platform (which could then be secured to a support structure such as a wall or a vehicle hood), whether for aiming or other purposes. Additionally, a locking mechanism can be included to prevent further movement of the weapon once a desired position is achieved or if the MPWH is being used strictly for storage of the firearm.

The MPWH can be designed to be small enough and light enough to be portable for use in the field. When brought to the field, the MPWH can include a Velcro strap that can be used for securing the MPWH to the user's vest. In a vehicle or airplane, the strap can also be used to prevent a weapon from dislodging due to bumps or turbulence. Moreover, the strap can secure additional components such as a removal tool or covering piece, as discussed herein. The MPWH can be semi-permanently attached to almost any surface for side by side use in any type of weapon storage equipment, unit or facility.

Weapons that are stored shipboard must often contend with rolling seas and engine vibration, conditions that may cause weapon damage. Newer ships are being made of lighter metals such as stainless steel and aluminum. Magnets will not work on these metals. When attaching the MPWH to these types of metals, a reclosable (e.g., Dual Lock) fastening system can be employed to attach the MPWH on these metals. In addition, the Velcro strap may help secure weapons and minimize damage in rough weather.

Consistent with embodiments of the present disclosure, the design of the lower platform may have multiple methods of securing the MPWH to a wide range of surfaces. These attachment mechanisms may include a fastener material such as 3M Dual Lock®, key slots, and magnets. A gripping material can also be used to resist sheering pressures. The combination of Dual Lock, magnets, gripping material and key slots allow the MPWH to securely adhere to almost any surface under any condition.

Dual Lock is a reclosable fastening system containing hundreds of mushroom-shaped plastic stems that audibly snap together to form a secure attachment approximately five times stronger than Velcro. Dual Lock has an adhesive backing. Different adhesives are available for different applications. Two opposing pieces of Dual Lock fasten to each other in order to create the bond. Dual Lock comes in varying stem densities, with a higher stem density resulting in a stronger bond. Dual Lock is easier to clean than Velcro. For instance, sand, dirt and mud may render Velcro inoperable, while the Dual Lock material can generally be rinsed clean with water to extend its useful life.

To properly engage (attach together) two pieces of Dual Lock, a rocking motion should be employed, fastening the pieces from one end to the other. The two-platform design of the MPWH's molded base allows the user to quickly and securely grip the MPWH while engaging the Dual Lock with a rocking motion. The pressure required to disengage (separate) two pieces of Dual lock is twice the amount of pressure required to engage the pieces. The use of Dual Lock allows the MPWH to be secured in a stationary manner to any surface, both vertically and horizontally, and in all weather conditions.

The bottom of the lower platform has a horizontal channel which runs completely through it and is visible on either end of the platform. Adhesive-type material (e.g., 3M 250 stem Dual Lock with VHB adhesive: SJ3550CF) can be placed in the channel. The open ends of the channel allow the MPWH to be rapidly secured, and allow the user to visually line up the Dual Lock on the MPWH with the Dual Lock attached to the fastening portion of the support surface. The channel can have a sufficient depth such that the Dual Lock material will not interfere with the function of the other fastening components (such as magnets and key slots), while still allowing for effective interaction of opposing piece of Dual Lock.

The use of the SJ3550CF Dual Lock material, a 250 stem version provided as a non-limiting example, can be particularly useful in connection with embodiments where the die cut ends of the Dual Lock are visible at the ends of the platform channel. The use of the CF (clear foam adhesive) allows the Dual Lock material to blend with any resin color, whereas other Dual Lock products have white foam which would be suitable in certain situations, e.g., where camouflage is important. Each MPWH can be provided with additional pieces of SJ3551CF Dual Lock, a 400 stem version provided as a non-limiting example, as well as an isopropyl alcohol wipe for cleaning the support surface to which the Dual Lock is to be adhered.

Embodiments of the present disclosure are directed toward MPWH devices that are configured and arranged to provide bond strength that meets a threshold value. The threshold bond strength can be met by modifying several factors. One factor is the type of reclosable fastening system that is used. For instance, the stem density is a variable for reclosable fastening systems such as Dual Lock. Another factor is the total area available for bonding. This can be controlled by adjusting the amount/area of useable reclosable fastening material that is on the MPWH and/or on the surface to which the MPWH is to be attached. In certain embodiments, different sized strips can be designed for attachment to the surface. A user of the MPWH can select the appropriate strip size based upon the desired bond strength. For instance, the user may seek greater bond strength when the surface is a ground vehicle that will be traveling over rough terrain and less bond strength when the surface is a stable structure, such as the wall of a building.

Embodiments of the present disclosure are directed toward the use of strips of one-half of a reclosable fastener system that can be conveniently placed on different structures. The MPWH can then be secured to these strips by connecting to the other half of the reclosable fastener system located in channel 906. Certain embodiments recognize that these strips can have varying sizes, which can balance between the desired bond strength and ease of application. For instance, it has been discovered that the use of strips that are smaller than the channel 906 can facilitate alignment.

The bottom of the lower platform can also be configured with cavities designed to include magnets. For instance, circular depressions can be placed near each corner. In a particular experimental embodiment, the cavities can be designed with a specific taper or draft to accommodate neodymium-iron-boron (NdFeB) magnets, which are provided here as an example of one of many well-known magnet types. For instance, circular magnets can be sized and configured to snap into corresponding molded cavities to provide attachment without the use of glue or adhesives; however, adhesives can be used instead of or in addition to the magnet snaps. The number and placement of magnets can vary according to the magnets' size and strength as well as the desired use. For instance, magnets can be placed in each corner for situations where very high levels of magnetism are desired. Aspects of the present disclosure are directed toward a manufacturing process that uses a mold designed to accommodate one or more plugs in the magnet cavities. The use of these plugs allows for the magnet cavities to be selectively implemented. In some embodiments, unused magnetic cavities can also be covered with a (over-molded) gripping material.

Consistent with certain embodiments, the magnets have a protective coating (e.g., a phenolic coating), which can be particularly useful for several reasons. For instance, the phenolic coating can dull the appearance of the magnets by coloring them black, which can reduce the visibility of the MPWH and help with camouflage. Moreover, magnets, such as neodymium-iron-boron magnets, may be susceptible to corrosion/oxidation. The phenolic coating can provide corrosion resistance, as well as providing abrasion resistance and chemical resistance.

The flat surfaces on either side of the platform's center channel can be covered by, over-molded or made from a gripping material (e.g., Santoprene or a 3M Gripping Material/Tile). The gripping material can prevent the MPWH from sliding on both vertical and horizontal planes, even when magnets (or other attachment mechanisms) are also present. Other embodiments allow the use of silicon-based products. Consistent with certain embodiments, the gripping material can be molded directly into the plastic of the platform. For example, the use of a Santoprene resin or a 3M Gripping Tile can provide a thin profile, which is useful for maintaining the effective magnetic strength.

In certain embodiments, one or more key slots can be molded into the outer edges of the bottom of the lower platform. The key slots provide a third method of fastening/securing the MPWH to the support structure. In controlled environments such as armories and offices, screws may be placed to facilitate key slot use. In the field, any protruding nail or screw may be used to hook the key slot to secure the MPWH.

The combination of Dual Lock fastener material, magnets, gripping material and key slots allow the MPWH to securely adhere to almost any surface under any environmental condition.

The top of the lower platform and the bottom of the upper platform can be ergonomically designed to allow the user to quickly and comfortably engage or disengage the unit using either the Dual Lock fastener material, magnets or key slots. The open space between platforms and textured surfaces allow for a firm grip on both platforms even when wet.

The center of the 2"×2" foam sheath can be fabricated to accommodate the barrels of a wide range of weapons and should be large enough to be appropriate for all non-crew served weapons used by the United States military and NATO allies.

The UL rated flame retardant foam can be specially formulated for use in the MPWH in order to meet military specifications. Fire prevention is a paramount concern onboard ships, and various foams can ignite quickly and also release toxic gases. Use of the flame-retardant foam greatly reduces the possibility of the MPWH catching fire.

As previously discussed, the Velcro strapping system secures the barrel of a weapon in the protective foam sheath. This feature prevents the weapon from falling out of the MPWH in a wide range of conditions, whether the weapon is used on an aircraft, on a ship, in the field, or in a weapons storage area.

Camouflage can be an important aspect of military and tactical equipment and operations. The MPWH can be manufactured to meet all current and standard camouflage colors: black, desert sand, forest green and navy grey. The foam component can also be colored to meet any camouflage requirement. The textured surface can be used to diffuse light that strikes the MPWH to reduce visibility of the MPWH (e.g., due to light reflecting off the surface).

The MPWH can be designed to facilitate the safe handling and storage of military and tactical weapons. For example, the MPWH can be designed to secure a rifle in a wide range of conditions. Many of the MPWH features can be specifically designed for use by members of all branches of the Armed Forces. These features can be also useful for other tactical organizations using weapons, e.g., Homeland Security, Border Patrol, state and local police departments, and SWAT teams.

The various embodiments relating to an MPWH device can be used in combination with other securing devices, systems and methods. Particular embodiments are directed toward the use of MPWH device(s) with a firearm butt securing device. Examples of such butt securing devices are provided in concurrently filed U.S. Pat. No. 8,973,297, entitled "MULTIPURPOSE FIREARM BUTT SECURING DEVICE AND METHODOLOGY," to Boggess et al., which is fully incorporated herein by reference. Moreover, MPWH device(s) can be included (and used) in a system or kit, which includes other attachment solutions including, but not limited to, a firearm butt securing device. Examples of such systems and kits are provided in concurrently filed U.S. patent application Ser. No. 13/842,886, entitled "MULTIPURPOSE FIREARM SECURING SYSTEMS, KITS AND METHODOLOGIES," to Tucker et al. Reference can also be made to U.S. Provisional Patent Application No. 61/735,236 to Tucker et al., which is fully incorporated herein by reference.

The various embodiments described above are provided by way of illustration only and should not be construed to limit the disclosure. Based upon the above discussion and illustrations, those skilled in the art will readily recognize that various modifications and changes may be made to the present disclosure without strictly following the exemplary embodiments and applications illustrated and described herein. For example, the methods, devices and systems discussed herein may be implemented in connection with various military environments and various types of applications. The disclosure may also be implemented using a variety of approaches such as those involving manufacturing variations and different uses of the MPWH device. Such modifications and changes do not depart from the true spirit and scope of the present disclosure, including that set forth in the following claims.

What is claimed is:

1. An apparatus comprising:
a first platform including a first securing interface configured and arranged to generate a holding force between the apparatus and a surface in response to an applied pressure;
a second platform including a second securing interface configured and arranged to receive and secure an object and including a graspable feature; and
a support piece physically connected to each of the two securing interfaces and extending between the first and second platforms along a direction that is about perpendicular to the first securing interface, the support piece configured and arranged to provide space between the first and second platforms along said direction that is sufficient to accommodate a person's fingers to permit holding the graspable feature and to allow for application of pressure sufficient to generate the holding force between the apparatus and the surface.

2. The apparatus of claim 1, wherein the object includes a firearm having an elongated tube or barrel structure, and the second platform is configured and arranged to secure the object by coupling to the elongated tube or barrel structure.

3. The apparatus of claim 1, wherein the object includes a sporting component having an elongated tubular structure, and the second platform is configured and arranged to secure the sporting component by coupling to the elongated tubular structure.

4. The apparatus of claim 1, wherein the object includes a tool component having an elongated tubular structure, and the second platform is configured and arranged to secure the tool component by coupling to the elongated tubular structure.

5. The apparatus of claim 1, wherein the first securing interface includes a rigid support portion and a gripping portion, the rigid support portion connecting to the support piece and the gripping portion configured and arranged to generate the holding force.

6. The apparatus of claim 1, wherein the second securing interface includes a rigid support portion and a holding portion, the rigid support portion located between, and connecting, the support piece and the holding portion, and the holding portion forming a cavity that conforms to the object and having deformable portions that are configured and arranged to elastically deform to increase a size of the cavity sufficient for the object to enter the cavity and, in response to entry of the object to the cavity, return to a pre-deformation state and thereby secure the object.

7. The apparatus of claim 6, wherein the deformable portions have an elasticity of sufficient pliability to allow removal of the object without breaking the holding force of the first securing interface.

8. The apparatus of claim 1, further including
a connecting structure that connects and is part of each of the first securing interface, the second securing interface and the support piece, and
on each of the first and second securing interfaces, a center stabilizing bar arranged on a centerline of the respective interface and a plurality of support bars extending from the centerline.

9. The apparatus of claim 1, wherein the support piece is further configured and arranged with the second platform to facilitate canting of the object by providing for rotation of the object relative to the second platform, while the second securing interface secures the object.

10. The apparatus of claim 1, wherein the first securing interface includes a recessed channel and half of a reclosable fastener located in the recessed channel, the reclosable fastener configured and arranged to fasten to another half of the reclosable fastener located on the surface.

11. The apparatus of claim 1, further including a grip mechanism on the first platform, the grip mechanism configured and arranged to maintain the holding force under shearing forces that are parallel to the surface.

12. The apparatus of claim 1,
wherein the object includes an elongated portion coupled to a remote portion and the second platform is configured and arranged to secure the elongated portion of the object,
further including a third platform that is separate from the first and second platforms, the third platform being configured and arranged to secure the remote portion of the object at a distance from the securing interface of the second platform, and therein being configured and arranged with the second platform to secure the entire object.

13. The apparatus of claim 12, wherein the third platform includes a securing mechanism configured and arranged to generate a holding force with the surface.

14. The apparatus of claim 13, wherein the first, second and third platforms are configured and arranged to secure the object to the surface while the support piece is inclined at an angle at which gravity applies a force to the object in a direction away from the support structure, and while the third platform is physically unattached from the first and second platforms.

15. A method comprising:
engaging a first platform with a first securing interface by generating a holding force between the first securing interface and a surface in response to an applied pressure;
securing an object with a second platform having a graspable feature and a second securing interface that receives and secures the object; and
wherein generating the holding force includes using a support piece physically connected to each of the two securing interfaces and extending between the first and second platforms along a direction that is about perpendicular to the first securing interface, the support piece providing space between the first and second platforms along said direction that is sufficient to accommodate a person's fingers to permit holding the graspable feature and to allow for application of pressure sufficient to generate the holding force between the first platform and the surface.

16. The method of claim 15, wherein securing the object includes securing an elongated tube or barrel structure by coupling to the elongated tube or barrel structure.

17. The method of claim 15,
wherein the object includes an elongated portion coupled to a remote portion,
wherein securing the object includes:
securing the elongated portion via the second platform,
securing the remote portion with a third platform that is separate from the first and second platforms, by securing the remote portion of the object at a distance from the second securing interface of the second platform, and therein securing the entire object.

18. A method comprising:
attaching a first half of a reclosable fastener to a surface;
presenting an object securing apparatus to the first half of the reclosable fastener, the object securing apparatus including
a first platform having a first securing interface and a second half of the reclosable fastener,
a second platform including a second securing interface configured and arranged to receive and secure the object and including a graspable feature, and
a support piece configured and arranged to physically connect the two securing interfaces, the support piece configured to provide space sufficient to accommodate a person's fingers to permit holding the graspable feature and to allow for application of pressure; and
applying a holding force at the graspable feature and between the object securing apparatus and the surface thereby fastening the object securing apparatus to the first half of the reclosable fastener via the second half of the reclosable fastener and securing the object securing apparatus to the surface.

19. The method of claim 18, further including a step of presenting the object to the second securing interface at a force sufficient to secure the object at the second securing interface of the object securing apparatus.

20. The method of claim 18, wherein fastening the object securing apparatus includes providing a securing force of the object securing apparatus to the surface that is greater than the holding force and greater than a force required to remove the object after the object is secured, further including removing the object securing apparatus from the surface by applying a removal force greater than the holding force.

* * * * *